(12) United States Patent
Nakamura et al.

(10) Patent No.: US 11,286,858 B2
(45) Date of Patent: Mar. 29, 2022

(54) GAS TURBINE COMBUSTOR

(71) Applicant: TOSHIBA ENERGY SYSTEMS & SOLUTIONS CORPORATION, Kawasaki (JP)

(72) Inventors: Yasuaki Nakamura, Yokohama (JP); Yasunori Iwai, Yokohama (JP); Masao Itoh, Yokohama (JP); Yuichi Morisawa, Yokohama (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 46 days.

(21) Appl. No.: 16/575,930

(22) Filed: Sep. 19, 2019

(65) Prior Publication Data

US 2020/0025089 A1    Jan. 23, 2020

Related U.S. Application Data

(63) Continuation of application No. PCT/JP2017/011226, filed on Mar. 21, 2017.

(51) Int. Cl.
*F02C 7/22* (2006.01)
*F02C 7/26* (2006.01)
(Continued)

(52) U.S. Cl.
CPC .................. *F02C 7/22* (2013.01); *F02C 7/26* (2013.01); *F05D 2260/61* (2013.01);
(Continued)

(58) Field of Classification Search
CPC .... F02C 7/22; F02C 7/232; F02C 7/26; F02C 9/26; F02C 9/50; F05D 2260/61;
(Continued)

(56) References Cited

U.S. PATENT DOCUMENTS 3,915,387 A * 10/1975 Caruel ...................... F23R 3/14
239/400
5,450,725 A    9/1995 Takahara et al.
(Continued)

FOREIGN PATENT DOCUMENTS

| JP | 7-19482 A | 1/1995 |
| JP | 11-264542 A | 9/1999 |

(Continued)

OTHER PUBLICATIONS

International Search Report dated May 9, 2017 in PCT/JP2017/011226, filed Mar. 21, 2017 (with English translation).
(Continued)

*Primary Examiner* — Thomas P Burke
(74) *Attorney, Agent, or Firm* — Oblon, McClelland, Maier & Neustadt, L.L.P.

(57) ABSTRACT

A combustor of an embodiment includes: a cylindrical combustor liner; and a fuel nozzle which is provided at one end of the combustor liner and jets a fuel and an oxidant into the combustor liner. The fuel nozzle includes: a plurality of fuel supply passages which each supply the fuel; and a plurality of oxidant supply passages which each supply the oxidant. Flow rates of the fuel supplied to the respective fuel supply passages and flow rates of the oxidant supplied to the respective oxidant supply passages are each individually regulated.

5 Claims, 16 Drawing Sheets

(51) Int. Cl.
*F23R 3/14* (2006.01)
*F23R 3/34* (2006.01)

(52) U.S. Cl.
CPC ............ *F23D 2206/10* (2013.01); *F23R 3/14* (2013.01); *F23R 3/343* (2013.01)

(58) Field of Classification Search
CPC .......... F23D 2206/10; F23R 3/14; F23R 3/34; F23R 3/343
See application file for complete search history.

(56) References Cited

U.S. PATENT DOCUMENTS

| | | | |
|---|---|---|---|
| 5,802,854 A | 9/1998 | Maeda et al. | |
| 6,418,726 B1* | 7/2002 | Foust | F23R 3/14 60/748 |
| 2002/0088234 A1* | 7/2002 | Brundish | F23D 11/107 60/740 |
| 2013/0327050 A1 | 12/2013 | Slobodyanskiy et al. | |
| 2014/0123672 A1 | 5/2014 | Huntington et al. | |
| 2016/0090911 A1 | 3/2016 | Iwai et al. | |
| 2017/0009995 A1* | 1/2017 | Witham | F23R 3/30 |

FOREIGN PATENT DOCUMENTS

| | | |
|---|---|---|
| JP | 2950720 B2 | 9/1999 |
| JP | 3205363 B2 | 9/2001 |
| JP | 2013-253771 A | 12/2013 |
| JP | 2016-8590 A | 1/2016 |
| JP | 2016-505101 A | 2/2016 |
| JP | 2016-70221 A | 5/2016 |

OTHER PUBLICATIONS

Written Opinion dated May 9, 2017 in PCT/JP2017/011226, filed Mar. 21, 2017.

* cited by examiner

GAS TURBINE COMBUSTOR

CROSS-REFERENCE TO RELATED APPLICATIONS

This application is a continuation of prior International Application No. PCT/JP2017/011226 filed on Mar. 21, 2017; the entire contents of all of which are incorporated herein by reference.

FIELD

Embodiments of the present invention relate to a gas turbine combustor.

BACKGROUND

In a conventional gas turbine, high-pressure air from a compressor is supplied to a combustor. The high-pressure air supplied to the combustor flows around a combustor liner to cool the combustor liner. A part of the high-pressure air which has cooled the combustor liner is supplied as combustion air to a fuel nozzle, for example. Then, a fuel and the high-pressure air are introduced from the fuel nozzle into the combustor liner. The fuel and the high-pressure air introduced into the combustor liner react with each other to form flames.

Further, another part of the high-pressure air which has cooled the combustor liner is introduced as the combustion air from introduction holes formed through the combustor liner into the combustor liner, for example.

FIG. 17 is a chart illustrating changes in a fuel flow rate and an air flow rate supplied to the combustor from ignition to a rated load in the conventional gas turbine. FIG. 18 is a chart illustrating a change in an equivalence ratio from the ignition to the rated load in the conventional gas turbine. Note that the equivalence ratio which is mentioned here is an equivalence ratio (overall equivalence ratio) calculated from the fuel and the combustion air which have been supplied to the combustor.

As illustrated in FIG. 17, the air flow rate is determined by operation characteristics of a compressor, so that the change with respect to the load is small. In contrast with this, in the fuel flow rate regulating the load, the change with respect to the load is larger than that of the air flow rate. Accordingly, as illustrated in FIG. 18, the equivalence ratio is increased from the ignition to the rated load.

Thus, in order to regulate the load, the conventional gas turbine is required to significantly change the fuel flow rate. Thus, in the conventional gas turbines, for example, there is a gas turbine including a low-load fuel supply system and a high-load fuel supply system. In this conventional gas turbine, the low-load fuel supply system is used from the ignition to a middle load, and both the low-load fuel supply system and the high-load fuel supply system are used from the middle load to the rated load.

On the other hand, regarding the air flow rate, in the conventional gas turbine, the air to be supplied from the compressor is supplied for cooling of the turbine and combustion to each part. Accordingly, a distribution of the air supplied to each part is regulated according to an opening area ratio of each part, so that the distribution is not changed by the load. Further, some conventional gas turbines have a function of regulating a distribution of an air amount to be supplied to the combustor by providing a movable valve around the combustor, inside the gas turbines. However, no conventional gas turbine includes a plurality of air supply systems and is provided with a function of individually regulating air flow rates to be supplied from the respective air supply systems by using flow rate regulating valves, or the like.

In recent years, in power generation plant including the gas turbine as described above, increasing efficiency is in progress in response to demands for reduction of carbon dioxide, resource conservation, and the like. Under such circumstances, a supercritical $CO_2$ gas turbine facility is under consideration. In this supercritical $CO_2$ gas turbine facility, carbon dioxide pressurized to a supercritical pressure is supplied to the combustor to combust a fuel and oxygen in a supercritical carbon dioxide atmosphere. Then, the higher-temperature carbon dioxide is made to work as a working fluid in the turbine, and this carbon dioxide is pressurized to the supercritical pressure again and is circulated in the combustor.

In this supercritical $CO_2$ gas turbine facility, in order to reduce an unburned content and an amount of residual oxygen in the working fluid to be circulated, flow rates of the fuel and an oxidant are regulated so that a ratio between the fuel and oxygen calculated from the total fuel and the total oxidant supplied to the combustor has a stoichiometric mixture ratio (equivalence ratio 1).

As described above, in the supercritical $CO_2$ gas turbine facility, it is necessary to regulate the fuel flow rate and the oxidant flow rate so as to have the stoichiometric mixture ratio. Therefore, it is necessary to also increase and decrease the oxidant flow rate in accordance with increase and decrease in the fuel flow rate.

However, in the conventional gas turbine, the change in the air flow rate with respect to the load is smaller than the change in the fuel flow rate with respect to the load. That is, in the convention gas turbine, the air flow rate cannot be optionally regulated in accordance with the fuel flow rate. Accordingly, as illustrated in FIG. 18, the equivalence ratio is increased from the time of the ignition to the time of the rated load. Further, the equivalence ratio is in a lean state of less than 1 even at the rated load, so that a combustion gas is released into the atmosphere in a state of containing surplus oxygen.

Further, even though a technology in the conventional gas turbine is applied to the supercritical $CO_2$ gas turbine facility, the oxidant flow rate cannot be regulated so as to have the stoichiometric mixture ratio from the ignition to the rated load.

DETAILED DESCRIPTION

Hereinafter, embodiments of the present invention will be explained with reference to the drawings.

A gas turbine combustor of an embodiment includes: a cylindrical combustor liner; and a fuel nozzle which is provided at one end of the combustor liner and jets a fuel and an oxidant into the combustor liner. The fuel nozzle includes: a plurality of fuel supply passages which each supply the fuel; and a plurality of oxidant supply passages which each supply the oxidant. Then, flow rates of the fuel supplied to the respective fuel supply passages and flow rates of the oxidant supplied to the respective oxidant supply passages are each individually regulated.

First Embodiment

Figure 1:
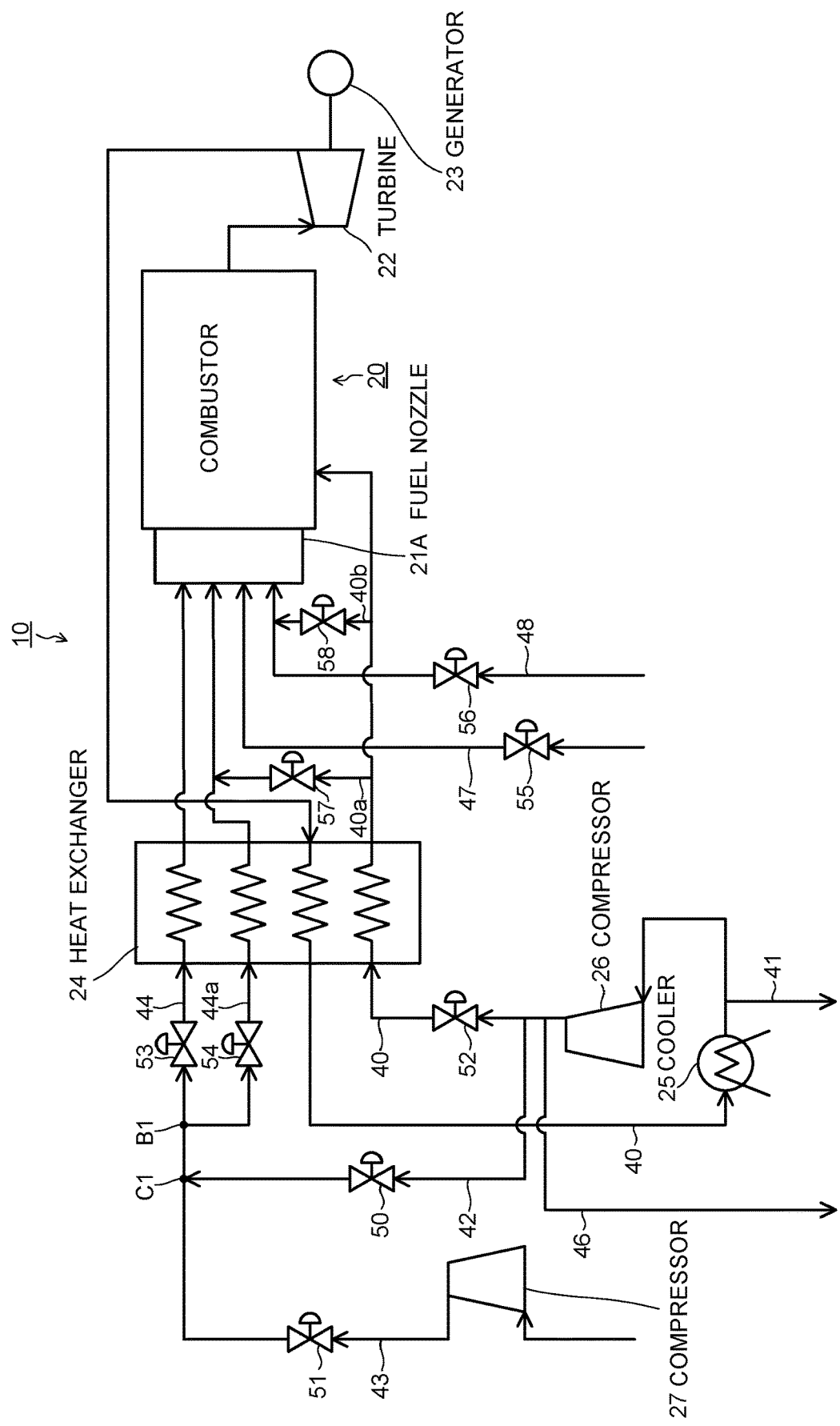
FIG. 1 is a system diagram of a gas turbine facility including a combustor of a first embodiment.

FIG. 1 is a system diagram of a gas turbine facility 10 including a combustor 20 of a first embodiment. As illustrated in FIG. 1, the gas turbine facility 10 includes the combustor 20 which combusts a fuel and an oxidant, a fuel nozzle 21A attached to the combustor 20, and a turbine 22 which is rotated by a combustion gas exhausted from the combustor 20. To the turbine 22, for example, a generator 23 is coupled. Note that the combustor 20 functions as a turbine combustor.

Further, the gas turbine facility 10 includes a heat exchanger 24 which cools a combustion gas exhausted from the turbine 22. Heat quantity obtained from the combustion gas is given to the later-described oxidant and carbon dioxide which are supplied to the combustor 20 and the fuel nozzle 21A.

Note that the combustion gas exhausted from the combustor 20, which is mentioned here, is the one which contains a combustion product produced from the fuel and the oxidant and the later-described carbon dioxide (a part of the combustion gas) supplied to the combustor 20 and exhausted from the combustor 20 together with the combustion product.

As illustrated in FIG. 1, the combustion gas exhausted from the combustor 20 is guided to the turbine 22 to rotate the turbine 22. Then, the rotation of the turbine 22 drives the generator 23.

The combustion gas exhausted from the turbine 22 is cooled by passing through the heat exchanger 24. The combustion gas which has passed through the heat exchanger 24 passes through a pipe 40 through a cooler 25. By passing through the cooler 25, the combustion gas is further cooled, and water vapor contained in the combustion gas is removed therefrom, resulting in that the combustion gas becomes a dry combustion gas.

Here, as the fuel to be supplied to the fuel nozzle 21A, for example, there is used a hydrocarbon gas such as natural gas or methane, liquid fuel such as kerosene, a coal gasification gas, or the like. In the combustor 20 of the gas turbine facility 10, for example, flow rates of the fuel and oxygen are regulated so as to have a stoichiometric mixture ratio (equivalence ratio 1). Note that the equivalence ratio which is mentioned here is an equivalence ratio (overall equivalence ratio) calculated from the fuel and the oxidant supplied to the combustor 20. Incidentally, also in the following, a definition of the equivalence ratio is the same as the above.

In a case of combustion in the equivalence ratio 1, most of components of the combustion gas from which the water vapor has been removed are carbon dioxide. Accordingly, hereinafter, the combustion gas from which the water vapor has been removed by passing through the cooler 25 is referred to as carbon dioxide. This carbon dioxide also includes, for example, a case where a slight amount of carbon monoxide, oxygen, or the like is mixed.

Note that the water vapor in the combustion gas condenses into water by passing through the cooler 25. The water is discharged through a pipe 41 to the outside, for example. Thus, the cooler 25 has a function of removing the water vapor in the combustion gas.

In the pipe 40, a compressor 26 is interposed in a downstream side of the cooler 25. The carbon dioxide flowing through the pipe 40 is pressurized by the compressor 26 to become a supercritical fluid.

In the downstream of the compressor 26, a pipe 42 and a pipe 46 each branching off the pipe 40 are provided. The pipe 42 is coupled to a pipe 43 through which the oxidant is made to flow. In the pipe 42, a flow rate regulating valve 50 is interposed. A part of the carbon dioxide which has become the supercritical fluid flows into the pipe 42, and, after its flow rate is regulated by the flow rate regulating valve 50, is guided into the pipe 43.

On the other hand, the pipe 46 is provided toward the outside of the system of the gas turbine facility 10. The carbon dioxide guided to the pipe 46 is exhausted to the outside. Here, an amount of the carbon dioxide exhausted from the pipe 46 corresponds to an amount of carbon dioxide produced by reaction of the fuel and oxygen in the combustor 20. The carbon dioxide exhausted to the outside can be utilized for EOR (Enhanced Oil Recovery) employed at an oil drilling field, for example.

Oxygen separated from the atmosphere by an air separating apparatus (not illustrated) flows through the pipe 43 through which the oxidant is made to flow. In the pipe 43, a compressor 27 and a flow rate regulating valve 51 are interposed. The oxidant flowing through the pipe 43 is pressurized to a supercritical fluid by the compressor 27, and its flow rate is regulated by the flow rate regulating valve 51. Further, the pipe 43 is coupled to the pipe 42 at a more downstream side than a position where the compressor 27 and the flow rate regulating valve 51 are provided.

The oxidant flows through a more downstream pipe 44 than a coupling part C1 of the pipe 42 and the pipe 43. The pipe 44 is coupled via the heat exchanger 24 to the fuel nozzle 21A.

Here, the oxidant which is made to flow through the pipe 44 includes a mixed gas obtained by mixing oxygen and carbon dioxide, besides oxygen. For example, when the flow rate regulating valve 50 of the pipe 42 is closed, only the oxygen flows through the pipe 44. Further, when the flow rate regulating valve 50 of the pipe 42 is opened, the mixed gas flows through the pipe 44.

Note that in the following, the oxygen and the mixed gas obtained by mixing oxygen and carbon dioxide are referred to as the oxidant.

Further, between the coupling part C1 and the heat exchanger 24, a pipe 44a branching off the pipe 44 is provided. This pipe 44a is coupled via the heat exchanger 24 to the fuel nozzle 21A.

In the pipe 44 between a branch part B1 of the pipe 44a and the heat exchanger 24, a flow rate regulating valve 53 is interposed. Further, in the pipe 44a between the branch part B1 and the heat exchanger 24, a flow rate regulating valve 54 is interposed.

The oxidant is guided through the pipes 44 and 44a through the heat exchanger 24 to the fuel nozzle 21A. The oxidant is heated in the heat exchanger 24 by obtaining the heat quantity from the combustion gas exhausted from the turbine 22.

For example, the oxidant is supplied to the pipe 44 from ignition to a rated load in the combustor 20. On the other hand, for example, the oxidant is supplied to the pipe 44a from a middle load to the rated load in the combustor 20.

Note that a plurality of pipes which branch off the pipe 44 to be coupled via the heat exchanger 24 to the fuel nozzle 21A can also be provided according to a form of the fuel nozzle 21A. Also in this case, in each of the pipes between the branch part B1 and the heat exchanger 24, a flow rate regulating valve is interposed.

Meanwhile, the carbon dioxide being the supercritical fluid which flows through the pipe 40 passes through the heat exchanger 24 after its flow rate is regulated by a flow rate regulating valve 52 interposed in the pipe 40. At this time, the carbon dioxide is heated in the heat exchanger 24 by obtaining the heat quantity from the combustion gas exhausted from the turbine 22. Then, the carbon dioxide flowing through the pipe 40 is guided to the combustor 20.

Here, the carbon dioxide guided to the combustor 20 cools, for example, the combustor liner and is introduced into a downstream side of a combustion zoon in the combustor liner from dilution holes or the like. This carbon dioxide rotates the turbine 22 together with the combustion gas produced by combustion.

Further, a pipe 47 and a pipe 48 which guide the fuel from a fuel supply source (not illustrated) into the fuel nozzle 21A are coupled to the fuel nozzle 21A. In the pipe 47 and the pipe 48, flow rate regulating valves 55 and 56 which regulate flow rates of the fuel are interposed respectively.

For example, the fuel is supplied to the pipe 47 from the ignition to the rated load in the combustor 20. On the other hand, for example, the fuel is supplied to the pipe 48 from the middle load to the rated load in the combustor 20.

Here, although the pipe 47 and the pipe 48 are exemplified, three or more pipes which guide the fuel into the fuel nozzle 21A can also be provided according to a form of the fuel nozzle 21A. Also in this case, in each of the pipes, a flow rate regulating valve is interposed.

Here, as illustrated in FIG. 1, for example, the pipe 40 may be made to branch at the downstream of the heat exchanger 24. For example, a pipe 40a branching off the pipe 40 may be coupled to the pipe 44a between the heat exchanger 24 and the fuel nozzle 21A. In the pipe 40a, a flow rate regulating valve 57 is interposed. In addition, for example, a pipe 40b branching off the pipe 40 may be coupled to the pipe 48. In the pipe 40b, a flow rate regulating valve 58 is interposed. Note that either branch part of the pipe 40a and the pipe 40b may be located at an upstream side.

Providing the pipe 40a in this manner makes it possible to guide the carbon dioxide after passing through the heat exchanger 24 to the pipe 44a. Further, providing the pipe 40b makes it possible to guide the carbon dioxide after passing through the heat exchanger 24 to the pipe 48.

For example, when the oxidant is supplied to the pipe 44a and the fuel is supplied to the pipe 48 at a time of a high-load condition from the middle load to the rated load in the combustor 20, nothing flows through the pipe 44a and the pipe 48 from the ignition to just before the middle load in the combustor 20. That is, from the ignition to just before the middle load, the flow rate regulating valve 54 and the flow rate regulating valve 56 are closed.

Thus, providing the pipe 40a and the pipe 40b allows the carbon dioxide to flow through the pipe 44a and the pipe 48 while the flow rate regulating valve 54 and the flow rate regulating valve 56 are closed.

Note that, here, although the pipe 40a branching off the pipe 40 and the pipe 48 are exemplified, the number of pipes branching off the pipe 40 can also be further increased according to a form of the fuel nozzle 21A. Also in this case, in each of the pipes, a flow rate regulating valve is interposed.

Further, by changing each branching position of the pipe 44a branching off the pipe 44 and the pipe 40a branching off the pipe 40 or changing their passage distances in the heat exchanger 24, it is also possible to regulate a temperature of the fluid flowing through each of the pipe 44 and the pipe 40 before branching to a different temperature.

As described above, in the gas turbine facility 10, a part of the carbon dioxide produced in the combustor 20 circulates in the system.

Next, a constitution of the fuel nozzle 21A will be explained with reference to FIG. 2.

Figure 2:
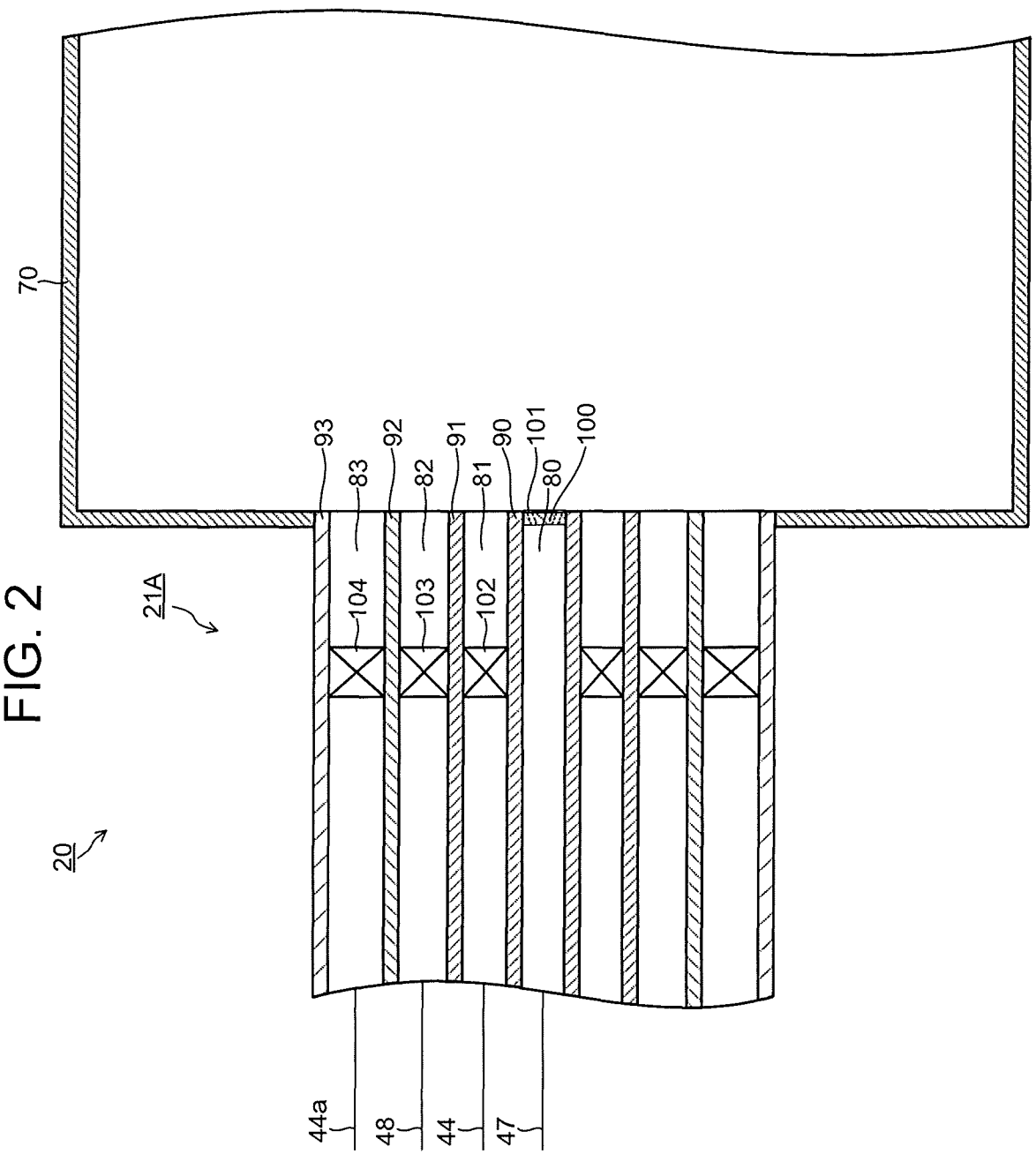
FIG. 2 is a view schematically illustrating a longitudinal section of a fuel nozzle of the combustor of the first embodiment.

FIG. 2 is a view schematically illustrating a longitudinal section of the fuel nozzle 21A of the combustor 20 of the first embodiment. Note that FIG. 2 schematically illustrates the pipes for supplying the oxidant and the fuel to respective passages of the fuel nozzle 21A.

As illustrated in FIG. 2, the fuel nozzle 21A is attached to an end portion on an upstream side of a cylindrical combustor liner 70. Note that in the combustor liner 70, the fuel and the oxidant jetted from the fuel nozzle 21A react with each other to be combusted.

The fuel nozzle 21A includes a plurality of fuel supply passages which each supply the fuel and a plurality of oxidant supply passages which each supply the oxidant.

Concretely, the fuel nozzle 21A includes a first fuel supply passage 80, a first oxidant supply passage 81, a second fuel supply passage 82, and a second oxidant supply passage 83. These passages are divided by cylindrical wall parts 90, 91, 92, and 93.

The first fuel supply passage 80 is a column-shaped passage provided in the center. The first fuel supply passage 80 is formed inside the wall part 90. The first fuel supply passage 80 communicates with the pipe 47. Then, the fuel is supplied to the first fuel supply passage 80 from the pipe 47.

A tip of the first fuel supply passage 80 (an end portion on the combustor liner 70 side) is closed by, for example, a flat plate 100. Then, for example, a plurality of jet ports 101 are formed in the flat plate 100.

Figure 3:
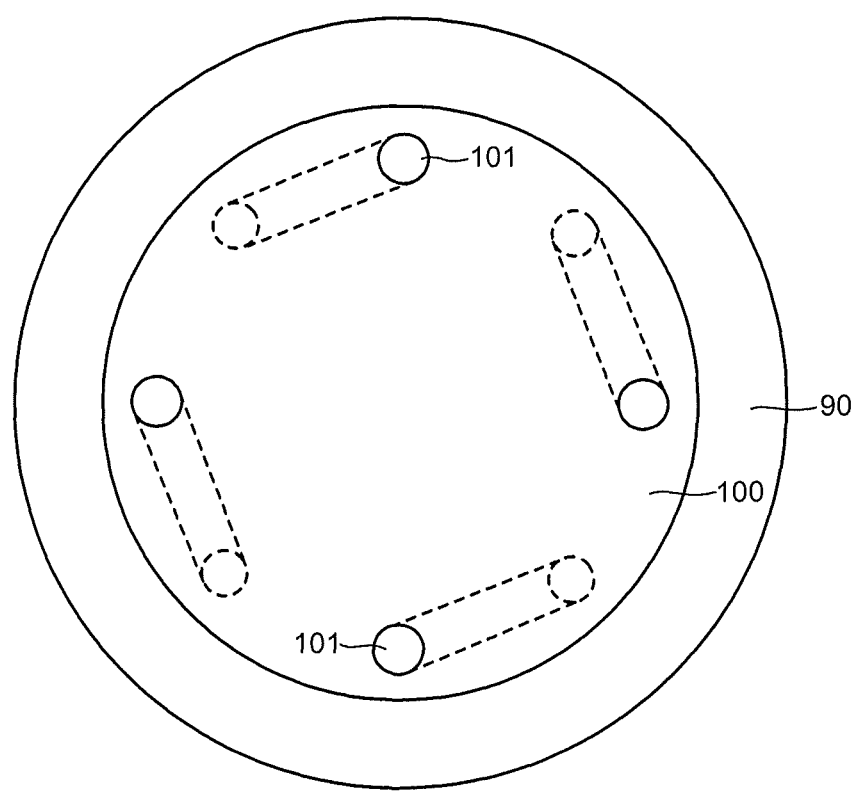
FIG. 3 is a plan view when a flat plate in the fuel nozzle of the combustor of the first embodiment is seen from a combustor liner side.

Here, FIG. 3 is a plan view when the flat plate 100 in the fuel nozzle 21A of the combustor 20 of the first embodiment is seen from the combustor liner 70 side.

As illustrated in FIG. 3, the jet ports 101 are formed, for example, so as to impart a swirling component to flows of the fuel jetted from the jet ports 101 into the combustor liner 70. Concretely, the jet ports 101 each penetrate the flat plate 100 so as to be inclined in a thickness direction of the flat plate 100 and inclined in a circumferential direction thereof. Note that the respective jet ports 101 are inclined as described above so as to impart the swirling component in the same direction as one another. Then, the swirling flow is generated by the flows of the fuel jetted from the respective jet ports 101.

As illustrated in FIG. 2, the first oxidant supply passage 81 is a ring-shaped passage formed between the wall part 90 and the wall part 91. Further, the first oxidant supply passage 81 is formed in a ring shape in an outer periphery of the first fuel supply passage 80. The first oxidant supply passage 81 communicates with the pipe 44. Then, the oxidant is supplied to the first oxidant supply passage 81 from the pipe 44.

In the first oxidant supply passage 81, a ring-shaped swirling flow generator 102 is provided so as to impart a swirling component to a flow of the oxidant jetted from the first oxidant supply passage 81 into the combustor liner 70. The oxidant passes through the swirling flow generator 102, thereby generating the swirling component in the flow of the oxidant. The swirling flow generator 102 is formed by, for example, a swirler or the like.

Further, the swirling flow generator 102 may have, for example, a constitution similar to that of the jet ports 101 formed in the flat plate 100 at the tip of the first fuel supply passage 80. That is, it is also possible to install a ring-shaped flat plate closing the first oxidant supply passage 81 and form a plurality of jet ports similar to the above-described jet ports 101 in the flat plate.

The second fuel supply passage 82 is a ring-shaped passage formed between the wall part 91 and the wall part 92. Further, the second fuel supply passage 82 is formed in a ring shape in an outer periphery of the first oxidant supply passage 81. The second fuel supply passage 82 communicates with the pipe 48. Then, the fuel is supplied to the second fuel supply passage 82 from the pipe 48.

In the second fuel supply passage 82, a ring-shaped swirling flow generator 103 is provided so as to impart a swirling component to a flow of the fuel jetted from the second fuel supply passage 82 into the combustor liner 70. The fuel passes through the swirling flow generator 103, thereby generating the swirling component in the flow of the fuel. The swirling flow generator 103 has the same constitution as that of the above-described swirling flow generator 102.

The second oxidant supply passage 83 is a ring-shaped passage formed between the wall part 92 and the wall part 93. Further, the second oxidant supply passage 83 is formed in a ring shape in an outer periphery of the second fuel supply passage 82. The second oxidant supply passage 83 communicates with the pipe 44a. Then, the oxidant is supplied to the second oxidant supply passage 83 from the pipe 44a.

In the second oxidant supply passage 83, a ring-shaped swirling flow generator 104 is provided so as to impart a swirling component to a flow of the oxidant jetted from the second oxidant supply passage 83 into the combustor liner 70. The oxidant passes through the swirling flow generator 104, thereby generating the swirling component in the flow of the oxidant. The swirling flow generator 104 has the same constitution as that of the above-described swirling flow generator 102.

Here, swirling directions of the swirling flow generated by passing through the jet ports 101 formed in the flat plate 100 at the tip of the first fuel supply passage 80 and the swirling flows generated by passing through the swirling flow generators 102, 103, and 104 are set, for example, in the same direction.

Setting the swirling directions in the same direction in this manner makes it possible to promote mixing of the fuel and the oxidant in a combustion area in the combustor liner 70. Further, setting the swirling directions in the same direction makes it possible to form stable flames in the combustor liner 70.

Thus, the fuel nozzle 21A includes two fuel supply systems and two oxidant supply systems. Concretely, the fuel nozzle 21A includes a pair of supply systems formed of the first fuel supply passage 80 and the first oxidant supply passage 81, and a pair of supply systems formed of the second fuel supply passage 82 and the second oxidant supply passage 83. In these respective fuel supply systems and oxidant supply systems, the flow rates can be regulated.

Here, for example, from the ignition to the rated load in the combustor 20, the fuel from the first fuel supply passage 80 and the oxidant from the first oxidant supply passage 81 are jetted into the combustor liner 70. Further, from the middle load to the rated load in the combustor 20, the fuel from the second fuel supply passage 82 and the oxidant from the second oxidant supply passage 83 are jetted into the combustor liner 70. Note that the jetted fuel and oxidant form flames to be combusted in the combustor liner 70.

In the fuel nozzle 21A, the first fuel supply passage 80 and the first oxidant supply passage 81 are adjacent to each other, and the second fuel supply passage 82 and the second oxidant supply passage 83 are adjacent to each other. Therefore, there are promoted mixing of the fuel jetted from the first fuel supply passage 80 and the oxidant jetted from the first oxidant supply passage 81 and mixing of the fuel jetted from the second fuel supply passage 82 and the oxidant jetted from the second oxidant supply passage 83. This allows formation of stable flames in the combustor liner 70.

Figure 4:
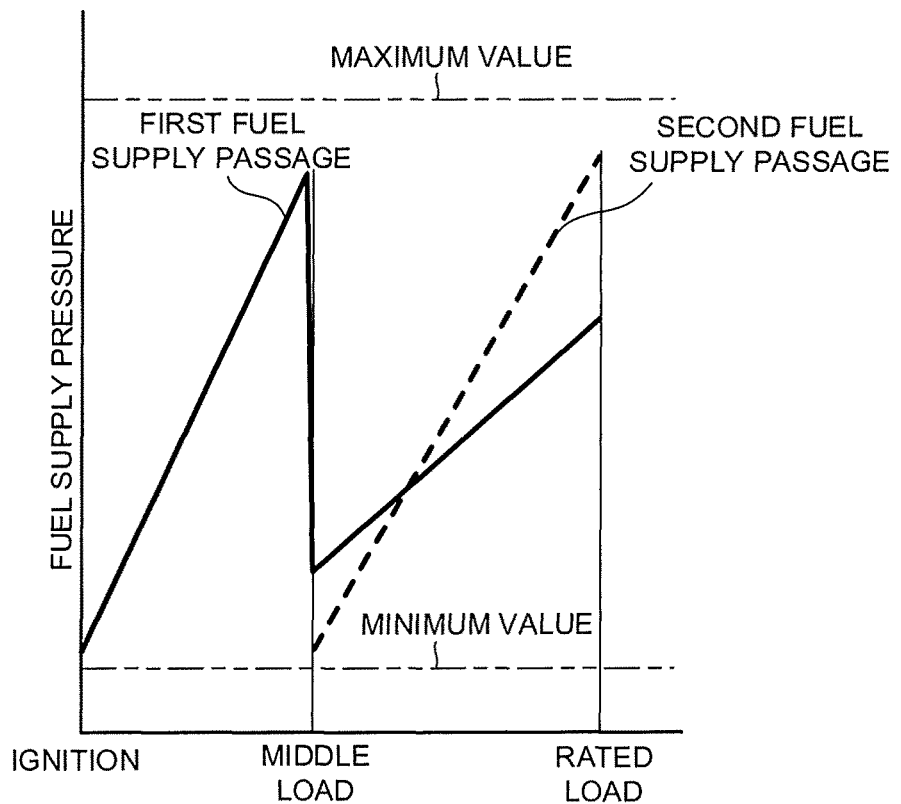
FIG. 4 is a chart illustrating a fuel supply pressure in the fuel nozzle according to a load on the combustor of the first embodiment.
Figure 5:
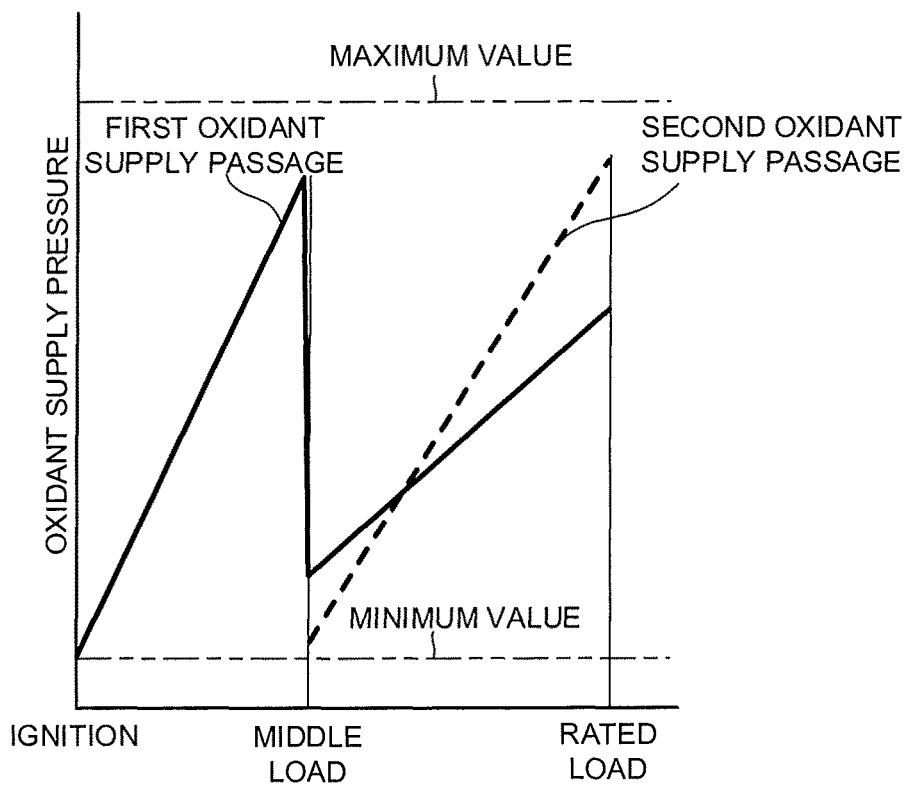
FIG. 5 is a chart illustrating an oxidant supply pressure in the fuel nozzle according to the load on the combustor of the first embodiment.
Figure 6:
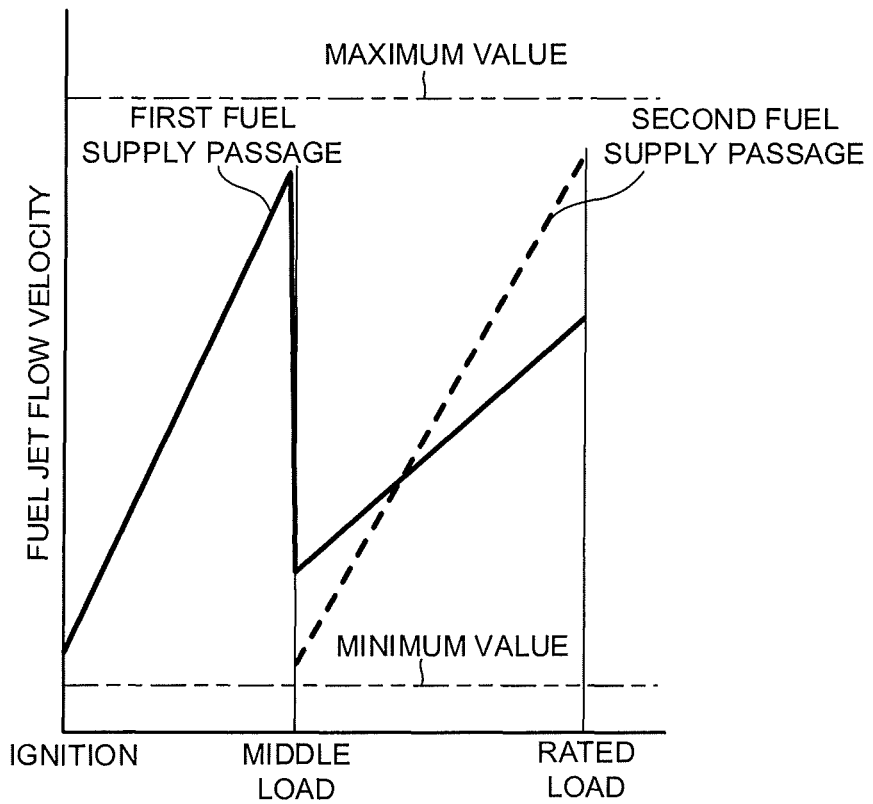
FIG. 6 is a chart illustrating a fuel jet flow velocity in the fuel nozzle according to the load on the combustor of the first embodiment.
Figure 7:
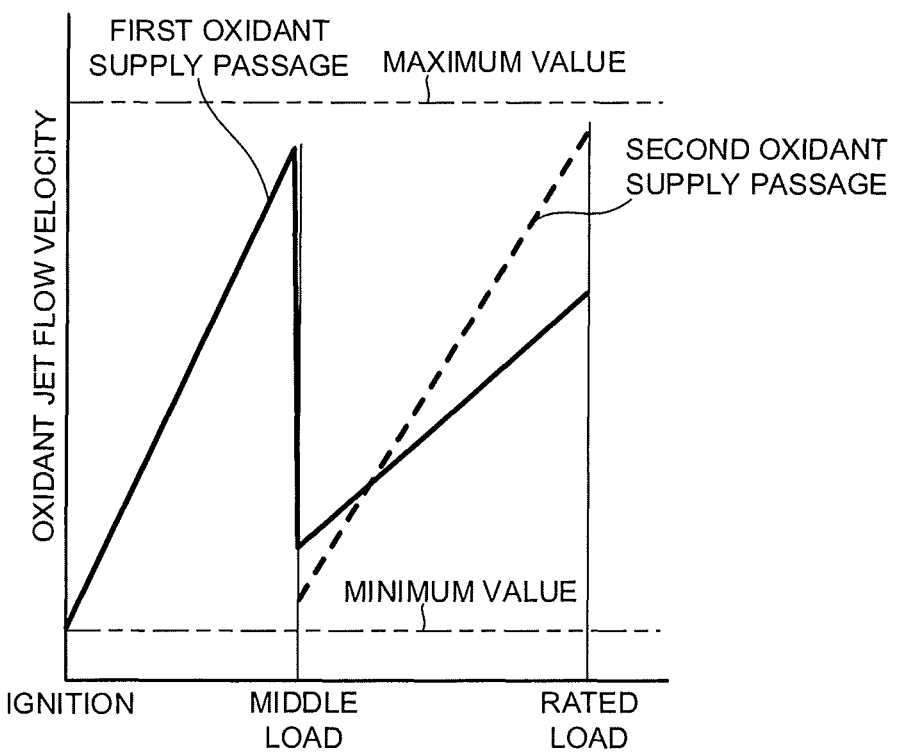
FIG. 7 is a chart illustrating an oxidant jet flow velocity in the fuel nozzle according to the load on the combustor of the first embodiment.

Here, FIG. 4 is a chart illustrating a fuel supply pressure in the fuel nozzle 21A according to the load on the combustor 20 of the first embodiment. FIG. 5 is a chart illustrating an oxidant supply pressure in the fuel nozzle 21A according to the load on the combustor 20 of the first embodiment. FIG. 6 is a chart illustrating a fuel jet flow velocity in the fuel nozzle 21A according to the load on the combustor 20 of the first embodiment. FIG. 7 is a chart illustrating an oxidant jet flow velocity in the fuel nozzle 21A according to the load on the combustor 20 of the first embodiment.

Note that the fuel supply pressure is a pressure of the fuel supplied to each of the first fuel supply passage 80 and the second fuel supply passage 82. The oxidant supply pressure is a pressure of the oxidant supplied to each of the first oxidant supply passage 81 and the second oxidant supply passage 83. The fuel jet flow velocity is a jet flow velocity of the fuel at each of an outlet of the first fuel supply passage 80 and an outlet of the second fuel supply passage 82. The oxidant jet flow velocity is a jet flow velocity of the oxidant at each of an outlet of the first oxidant supply passage 81 and an outlet of the second oxidant supply passage 83.

Further, a maximum value of the pressure in each of FIG. 4 and FIG. 5 is set based on either smaller one of pressures obtained from an upper limit of an applicable pressure in terms of the system and an upper limit of a flow velocity of each of the fuel and the oxidant jetted into the combustor 20 for the purpose of maintaining stable combustion in the combustor 20. A minimum value of the pressure in each of FIG. 4 and FIG. 5 is set based on a pressure obtained from the lowest flow velocity of each of the fuel and the oxidant jetted into the combustor 20 for the purpose of maintaining stable combustion.

A maximum value of the flow velocity in each of FIG. 6 and FIG. 7 is set based on an upper limit of a flow velocity of each of the fuel and the oxidant jetted into the combustor 20 for the purpose of maintaining stable combustion in the combustor 20. A minimum value of the flow velocity in each of FIG. 6 and FIG. 7 is set based on a lower-limit flow velocity of each of the fuel and the oxidant jetted into the combustor 20 for the purpose of maintaining stable combustion in the combustor 20.

Passage cross-sectional areas of the first fuel supply passage 80 and the first oxidant supply passage 81 provided on the center side of the fuel nozzle 21A are smaller than passage cross-sectional areas of the second fuel supply passage 82 and the second oxidant supply passage 83. Thus, in the combustor 20, in operation under a low-load condition from the ignition to just before the middle load, the first fuel supply passage 80 and the first oxidant supply passage 81 are used.

As illustrated in FIG. 4 and FIG. 5, under the low-load condition from the ignition to just before the middle load, with an increase in the load, while maintaining the equivalence ratio at 1, a fuel flow rate supplied to the first fuel supply passage 80 and an oxidant flow rate supplied to the first oxidant supply passage 81 are increased. At this time, as illustrated in FIG. 6 and FIG. 7, the jet flow velocity of the fuel and the jet flow velocity of the oxidant increase with the increase in the load.

Note that from the ignition to just before the middle load, the flow rate regulating valve 54 and the flow rate regulating valve 56 illustrated in FIG. 1 are closed. Therefore, the fuel and the oxidant do not pass through the second fuel supply passage 82 and the second oxidant supply passage 83.

Then, at a time of an arrival at the middle load, while maintaining the equivalence ratio at 1, the fuel flow rate supplied to the first fuel supply passage 80 and the oxidant flow rate supplied to the first oxidant supply passage 81 are decreased, and the fuel is supplied to the second fuel supply passage 82 and the oxidant is supplied to the second oxidant supply passage 83.

Accordingly, the supply pressure of the fuel supplied to the first fuel supply passage 80 and the supply pressure of the oxidant supplied to the first oxidant supply passage 81 are decreased. Further, the fuel jet flow velocity from the first fuel supply passage 80 and the oxidant jet flow velocity from the first oxidant supply passage 81 are decreased.

As illustrated in FIG. 4 to FIG. 7, at a time of an arrival at the middle load, none of the fuel supply pressure, the oxidant supply pressure, the fuel jet flow velocity, and the oxidant jet flow velocity reaches the maximum value.

As going from the middle load to the rated load, there are increased the fuel flow rate supplied to the first fuel supply passage 80 in which the flow rate has been once decreased and the oxidant flow rate supplied to the first oxidant supply passage 81 in which the flow rate has been once decreased, and there are increased the fuel flow rate supplied to the second fuel supply passage 82 and the oxidant flow rate supplied to the second oxidant supply passage 83. Then, an output is increased to the rated load.

Thus, from the middle load to the rated load, all the passages of the first fuel supply passage 80, the second fuel supply passage 82, the first oxidant supply passage 81, and the second oxidant supply passage 83 are used.

As illustrated in FIG. 4 to FIG. 7, even at a time of an arrival at the rated load, none of the fuel supply pressure, the oxidant supply pressure, the fuel jet flow velocity, and the oxidant jet flow velocity reaches the maximum value. Thus, the fuel supply and the oxidant supply are each regulated between the maximum value and the minimum value.

Figure 8:
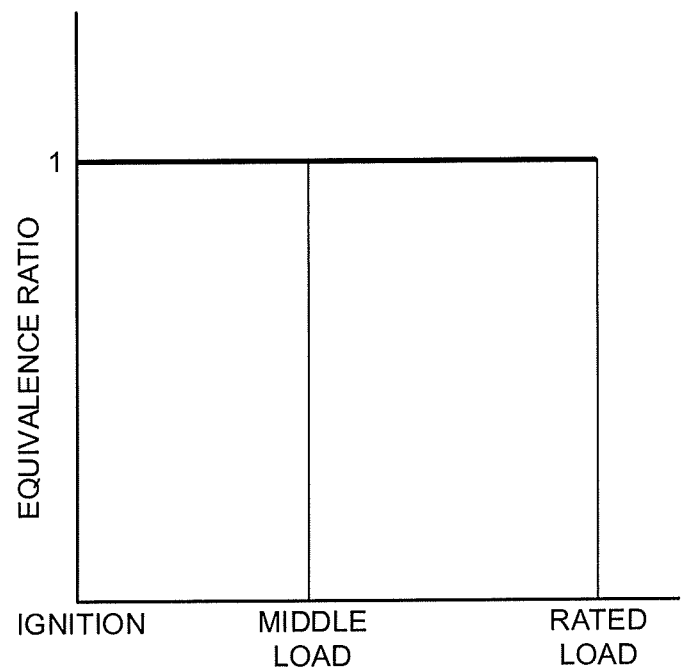
FIG. 8 is a chart illustrating a change in an equivalence ratio according to the load on the combustor of the first embodiment.

Here, FIG. 8 is a chart illustrating a change in the equivalence ratio according to the load on the combustor 20 of the first embodiment. As illustrated in FIG. 8, regardless of the change in the load, the equivalence ratio is maintained at 1 of the constant value.

Thus, in the combustor 20, by using the first fuel supply passage 80 and the first oxidant supply passage 81 having the small passage cross-sectional areas at a time of the low-load condition from the ignition to just before the middle load, and by using all the passages at a time of the high-load condition from the middle load to the rated load, it is possible to suppress an excessive rise in the fuel supply pressure and the oxidant supply pressure. Using the the supply passages selectively according to the load in this manner eliminates a need to perform an increase in size of the fuel compressor and the oxidant compressor, installation of high-pressure piping, or the like.

Here, from the ignition to just before the middle load, the flow rate regulating valve 54 and the flow rate regulating valve 56 illustrated in FIG. 1 are closed. Therefore, the fuel and the oxidant do not pass through the second fuel supply passage 82 and the second oxidant supply passage 83. Thus, the flow rate regulating valve 57 and the flow rate regulating valve 58 are opened, and the carbon dioxide after passing through the heat exchanger 24 may be guided to the second fuel supply passage 82 and the second oxidant supply passage 83. Note that at a time of the arrival at the middle load, the flow rate regulating valve 57 and the flow rate regulating valve 58 are closed.

This makes it possible to suppress a backflow of the combustion gas in the combustor liner 70 into the second fuel supply passage 82 and the second oxidant supply passage 83.

As described above, according to the combustor 20 of the first embodiment, in the respective fuel supply systems and oxidant supply systems, the flow rates can be regulated. Accordingly, the oxidant flow rates can be increased in accordance with the increase in the fuel flow rates accompanying the load. This makes it possible to maintain the equivalence ratio at 1 regardless of the change in the load.

Further, by including a plurality of fuel supply passages and a plurality of oxidant supply passages, the supply passages can be used selectively according to the load. This makes it possible to suppress an excessive rise in the supply pressures of the fuel and the oxidant, and maintain stable combustion.

Second Embodiment

Figure 9:
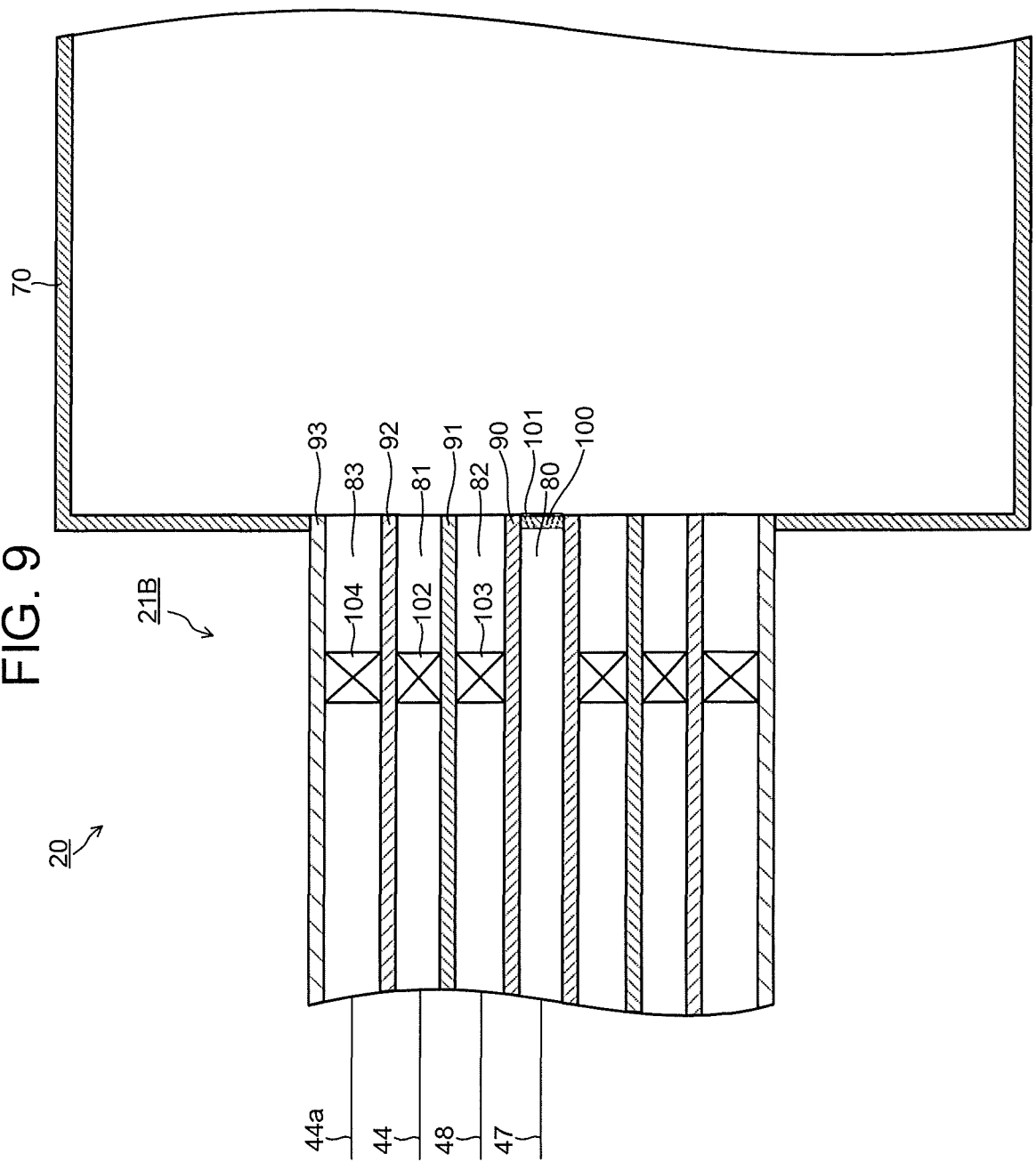
FIG. 9 is a view schematically illustrating a longitudinal section of a fuel nozzle of a combustor of a second embodiment.

FIG. 9 is a view schematically illustrating a longitudinal section of a fuel nozzle 21B of a combustor 20 of a second embodiment. Note that FIG. 9 schematically illustrates pipes for supplying an oxidant and a fuel to respective passages of the fuel nozzle 21B. Further, in the following embodiment, the same constituent portions as those of the constitution of the first embodiment are denoted by the same reference signs, and redundant descriptions are omitted or simplified.

Here, the fuel nozzle 21B of the combustor 20 of the second embodiment is different from the fuel nozzle 21A of the combustor 20 of the first embodiment in an arrangement constitution of fuel supply passages and oxidant supply passages. Here, this different constitution will be mainly explained.

Note that a system of a gas turbine facility in the second embodiment is the same as the system of the gas turbine facility in the first embodiment illustrated in FIG. 1.

As illustrated in FIG. 9, the fuel nozzle 21B is attached to an end portion on an upstream side of a cylindrical combustor liner 70. Note that in the combustor liner 70, the fuel and the oxidant jetted from the fuel nozzle 21B react with each other to be combusted.

The fuel nozzle 21B includes a plurality of fuel supply passages which each supply the fuel and a plurality of oxidant supply passages which each supply the oxidant. Concretely, the fuel nozzle 21B includes a first fuel supply passage 80, a second fuel supply passage 82, a first oxidant supply passage 81, and a second oxidant supply passage 83. These passages are divided by cylindrical wall parts 90, 91, 92, and 93.

As illustrated in FIG. 9, the first fuel supply passage 80 is a column-shaped passage provided in the center. The first fuel supply passage 80 is formed inside the wall part 90.

The second fuel supply passage 82 is a ring-shaped passage formed between the wall part 90 and the wall part 91. Further, the second fuel supply passage 82 is formed in a ring shape in an outer periphery of the first fuel supply passage 80.

The first oxidant supply passage 81 is a ring-shaped passage formed between the wall part 91 and the wall part 92. Further, the first oxidant supply passage 81 is formed in a ring shape in an outer periphery of the second fuel supply passage 82.

The second oxidant supply passage 83 is a ring-shaped passage formed between the wall part 92 and the wall part 93. Further, the second oxidant supply passage 83 is formed in a ring shape in an outer periphery of the first oxidant supply passage 81.

Here, similarly to the first embodiment, from ignition to a rated load in the combustor 20, the fuel from the first fuel supply passage 80 and the oxidant from the first oxidant supply passage 81 are jetted into the combustor liner 70. Further, from a middle load to the rated load in the combustor 20, the fuel from the second fuel supply passage 82 and the oxidant from the second oxidant supply passage 83 are jetted into the combustor liner 70.

Further, from the ignition to just before the middle load, similarly to the first embodiment, the carbon dioxide after passing through a heat exchanger 24 may be guided to the second fuel supply passage 82 and the second oxidant supply passage 83.

Here, a swirling component imparted by passing through a swirling flow generator 102 provided in the first oxidant supply passage 81 is preferably smaller than a swirling component imparted by passing through a swirling flow generator 103 provided in the second fuel supply passage 82. That is, a swirling component of a flow of the oxidant jetted from the first oxidant supply passage 81 into the combustor liner 70 is preferably smaller than a swirling component of a flow of the fuel jetted from the second fuel supply passage 82 into the combustor liner 70.

Further, in the first oxidant supply passage 81, the swirling flow generator 102 need not be provided. Note that when the swirling flow generator 102 is not provided, the oxidant is jetted from an outlet of the first oxidant supply passage 81 in an axial direction of the combustor liner 70.

Thus, reducing or eliminating the swirling component of the flow of the oxidant jetted from the first oxidant supply passage 81 suppresses a spread of the flow jetted from the first oxidant supply passage 81 to the outside of a circumferential direction thereof. This promotes mixing of the oxidant jetted from the first oxidant supply passage 81 and the fuel jetted from the first fuel supply passage 80 and having a swirling component.

As described above, according to the combustor 20 of the second embodiment, for example, from the middle load to the rated load, the fuel having almost the same temperature flows through the adjacent first fuel supply passage 80 and second fuel supply passage 82. Further, the oxidant heated by the heat exchanger 24 flows through the adjacent first oxidant supply passage 81 and second oxidant supply passage 83.

On the other hand, from the ignition to just before the middle load, by making the carbon dioxide after passing through the heat exchanger 24 flow through the second fuel supply passage 82 and the second oxidant supply passage 83, the oxidant and the carbon dioxide heated by the heat exchanger 24 flow through the first oxidant supply passage 81 adjacent to them, the second fuel supply passage 82 and the second oxidant supply passage 83.

Thus, it is possible to reduce a temperature difference between the fluids passing through the adjacent passages. This makes it possible to reduce a thermal elongation difference between the wall parts forming the passages, and thermal stress generated in the wall parts.

Further, in the combustor 20 of the second embodiment, similarly to the first embodiment, oxidant flow rates can be increased in accordance with an increase in fuel flow rates accompanying the load, so that it is possible to maintain an equivalence ratio at 1 regardless of a change in the load. Further, by including the plurality of fuel supply passages and the plurality of oxidant supply passages, it is possible to suppress an excessive rise in supply pressures of the fuel and the oxidant, and maintain stable combustion.

Figure 10:
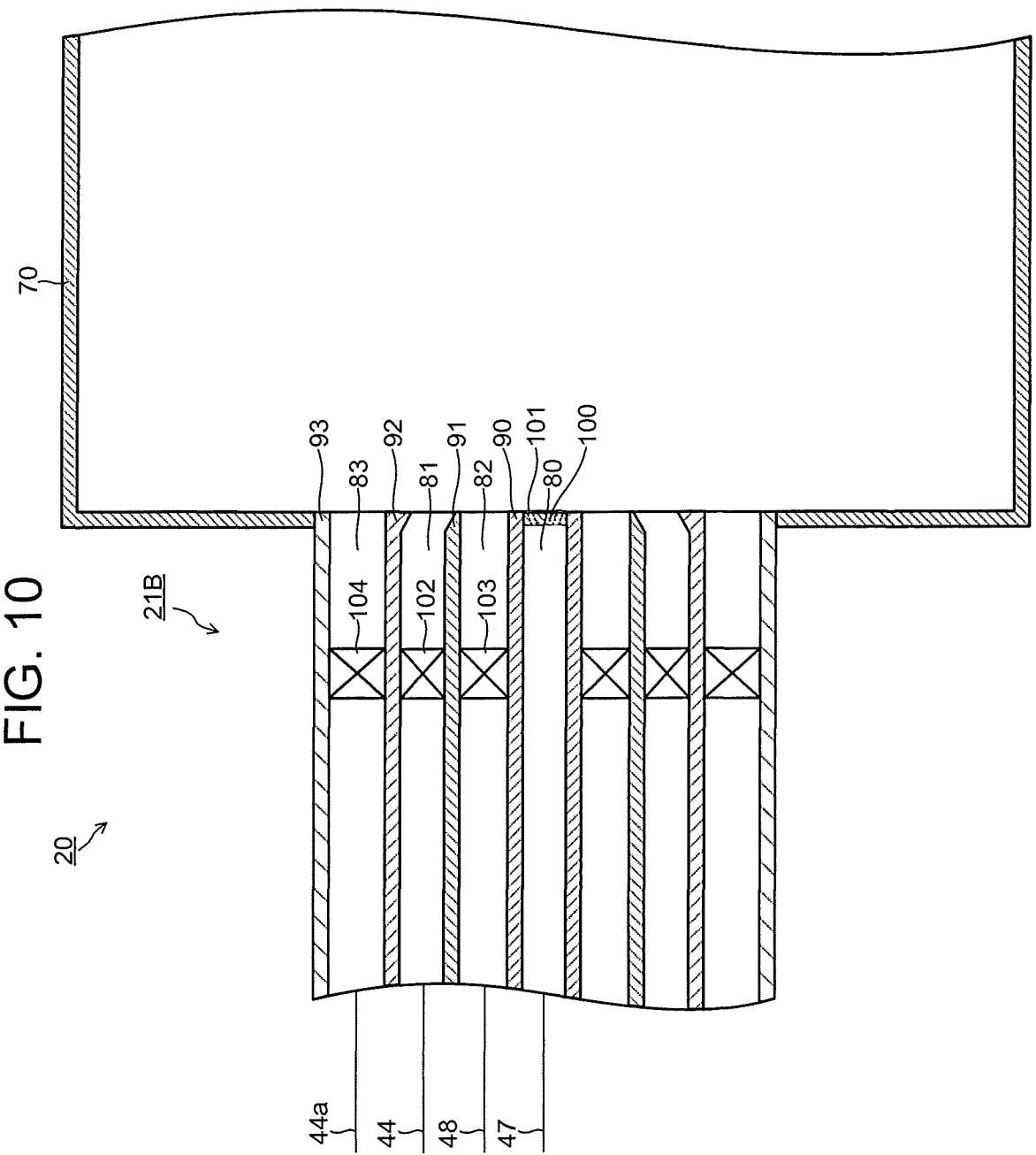
FIG. 10 is a view schematically illustrating a longitudinal section of the fuel nozzle having another structure, of the combustor of the second embodiment.

Here, FIG. 10 is a view schematically illustrating a longitudinal section of the fuel nozzle 21B having another structure, of the combustor 20 of the second embodiment.

In a case of reducing or eliminating the swirling component of the flow of the oxidant jetted from the first oxidant supply passage 81, as illustrated in FIG. 10, a ring-shaped outlet end portion of the first oxidant supply passage 81 may be inclined to the second fuel supply passage 82 side. This makes it easier that the oxidant jetted from the first oxidant supply passage 81 is mixed with the fuel jetted from the first fuel supply passage 80 and having the swirling component.

Third Embodiment

Figure 11:
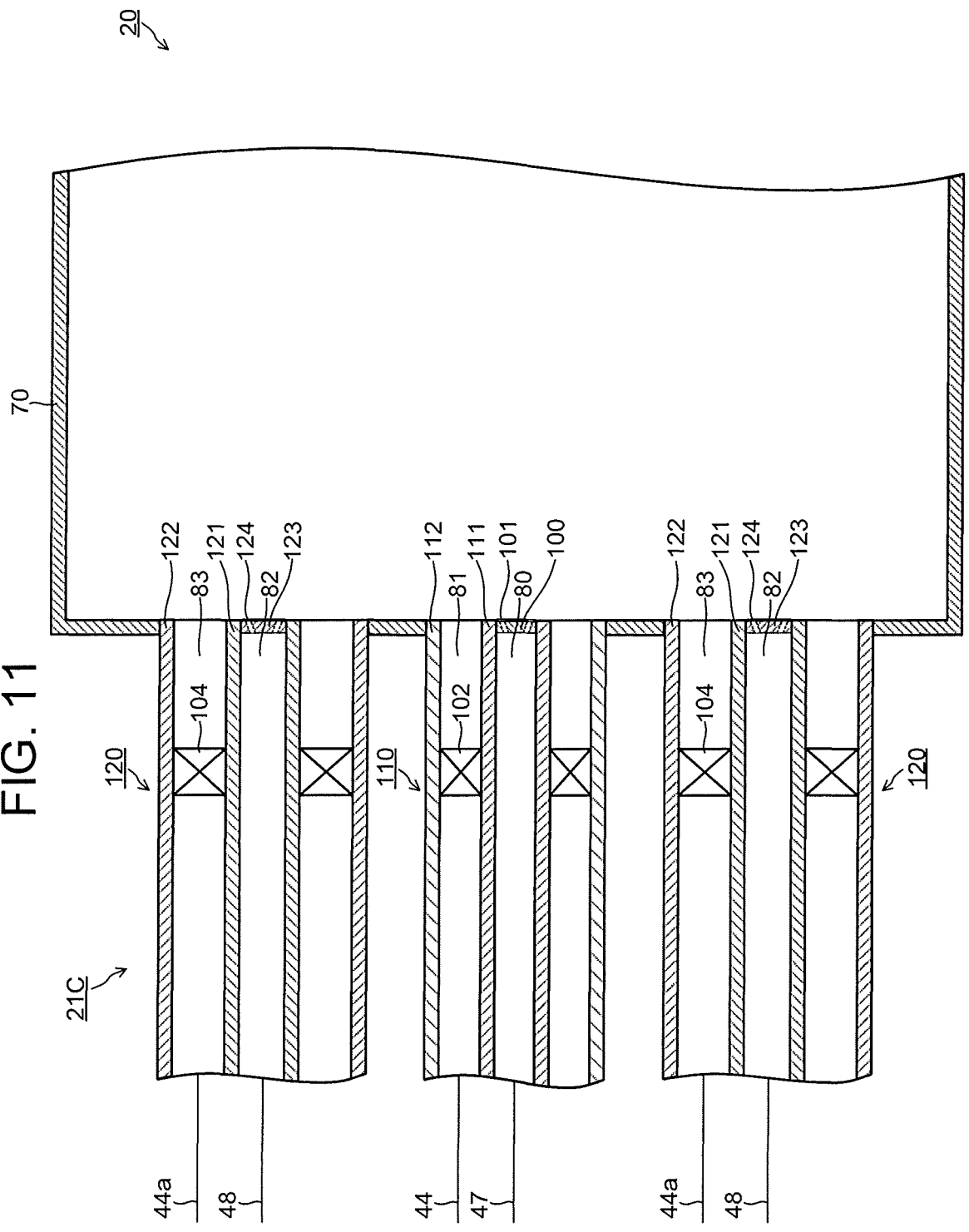
FIG. 11 is a view schematically illustrating a longitudinal section of a fuel nozzle of a combustor of a third embodiment.
Figure 12:
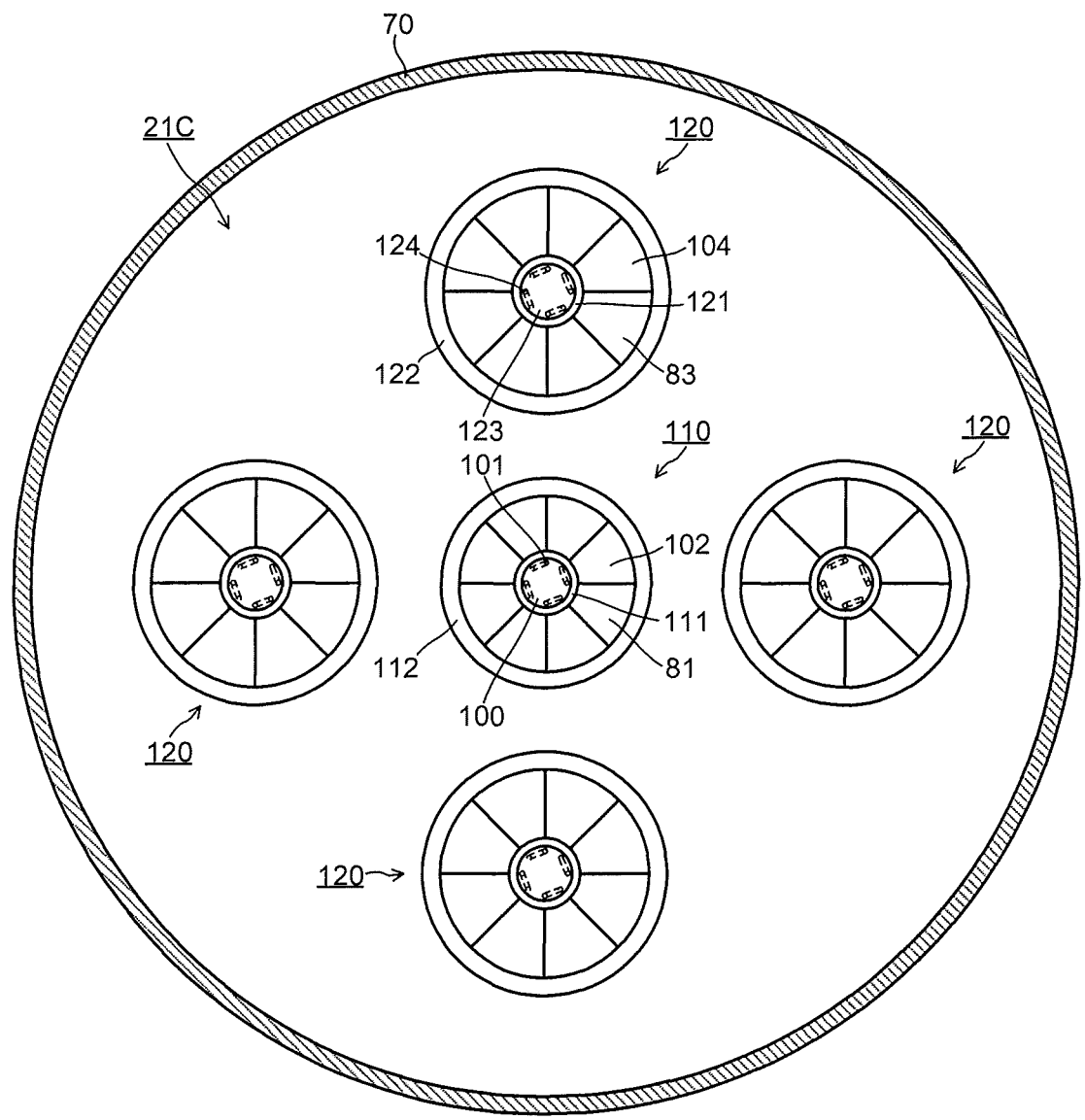
FIG. 12 is a plan view when the fuel nozzle of the combustor of the third embodiment is seen from a combustor liner side.

FIG. 11 is a view schematically illustrating a longitudinal section of a fuel nozzle 21C of a combustor 20 of a third embodiment. FIG. 12 is a plan view when the fuel nozzle 21C of the combustor 20 of the third embodiment is seen from a combustor liner 70 side. Note that FIG. 11 schematically illustrates pipes for supplying an oxidant and a fuel to respective passages of the fuel nozzle 21C.

Note that a system of a gas turbine facility in the third embodiment is the same as the system of the gas turbine facility in the first embodiment illustrated in FIG. 1.

As illustrated in FIG. 11 and FIG. 12, the fuel nozzle 21C includes a first fuel nozzle part 110 and second fuel nozzle parts 120. As illustrated in FIG. 12, for example, the first fuel nozzle part 110 is provided in the center, and a plurality of the second fuel nozzle parts 120 are provided around the first fuel nozzle part 110.

As illustrated in FIG. 11, the first fuel nozzle part 110 includes a first fuel supply passage 80 and a first oxidant supply passage 81. These passages are divided by cylindrical wall parts 111 and 112.

The first fuel supply passage 80 is a column-shaped passage provided in the center. The first fuel supply passage 80 is formed inside the wall part 111. The first fuel supply passage 80 communicates with a pipe 47. A tip of the first fuel supply passage 80 (an end portion on the combustor liner 70 side) is closed by a flat plate 100 in which a plurality of jet ports 101 are formed, similarly to the first embodiment.

The first oxidant supply passage 81 is a ring-shaped passage formed between the wall part 111 and the wall part 112. The first oxidant supply passage 81 is formed in a ring shape in an outer periphery of the first fuel supply passage 80. The first oxidant supply passage 81 communicates with a pipe 44. Further, a ring-shaped swirling flow generator 102 is provided in the first oxidant supply passage 81.

The second fuel nozzle parts 120 each include a second fuel supply passage 82 and a second oxidant supply passage 83. These passages are divided by cylindrical wall parts 121 and 122.

Each of the second fuel supply passages 82 is a column-shaped passage provided in the center. The second fuel supply passages 82 are each formed inside the wall part 121. The second fuel supply passages 82 each communicate with a pipe 48. A tip of each of the second fuel supply passages 82 (an end portion on the combustor liner 70 side) is closed by a flat plate 123 having the same constitution as that of the flat plate 100 in the first fuel supply passage 80, in which a plurality of jet ports 124 are formed.

Each of the second oxidant supply passages 83 is a ring-shaped passage formed between the wall part 121 and the wall part 122. The second oxidant supply passages 83 are each formed in a ring shape in an outer periphery of the second fuel supply passage 82. The second oxidant supply passages 83 each communicate with a pipe 44a. Further, a ring-shaped swirling flow generator 104 is provided in each of the second oxidant supply passages 83.

Here, swirling directions of a swirling flow generated by passing through the jet ports 101 formed in the flat plate 100 at the tip of the first fuel supply passage 80, swirling flows generated by passing through the jet ports 124 formed in the flat plates 123 at the tips of the second fuel supply passages 82, and swirling flows generated by passing through the swirling flow generators 102 and 104 are set, for example, in the same direction.

By setting the swirling directions in the same direction in this manner, for example, when the fuel and the oxidant are jetted from the first fuel nozzle part 110 and the second fuel nozzle parts 120 to combust them, it is possible to promote mixing of the fuel and the oxidant in a combustion area in the combustor liner 70.

Here, for example, from ignition to a rated load in the combustor 20, the first fuel nozzle part 110 is used. Further, from a middle load to the rated load in the combustor 20, the second fuel nozzle parts 120 are used.

That is, from the ignition to the rated load in the combustor 20, the fuel from the first fuel supply passage 80 and the oxidant from the first oxidant supply passage 81 are jetted into the combustor liner 70. Further, from the middle load to the rated load in the combustor 20, the fuel from the second fuel supply passages 82 and the oxidant from the second oxidant supply passages 83 are jetted into the combustor liner 70.

From the ignition to the rated load, flames are formed in the downstream of the first fuel nozzle part 110. Further, from the middle load to the rated load, flames are formed in the downstream of the first fuel nozzle part 110 and the second fuel nozzle parts 120.

Here, in the second fuel nozzle parts 120 provided in a plural number, for example, the number of fuel nozzle parts to be used may be increased with an increase in the load. Further, in the second fuel nozzle parts 120 provided in a plural number, for example, all the second fuel nozzle parts 120 may be used from the time of the middle load. In this case, the load in each of the second fuel nozzle parts 120 is increased with the increase in the load.

Further, from the ignition to just before the middle load, similarly to the first embodiment, the carbon dioxide after passing through a heat exchanger 24 may be guided to the second fuel supply passages 82 and the second oxidant supply passages 83, namely, the second fuel nozzle parts 120.

As described above, the combustor 20 of the third embodiment includes the plurality of fuel nozzle parts which each jet the fuel and the oxidant. Then, fuel flow rates and oxidant flow rates in the respective fuel nozzle parts can be each individually regulated.

At a time of a high-load condition from the middle load to the rated load, increasing the load by using the plurality of second fuel nozzle parts 120 makes it possible to uniformize a temperature in a combustion area.

Further, in the combustor 20 of the third embodiment, similarly to the first embodiment, the oxidant flow rates can be increased in accordance with an increase in the fuel flow rates accompanying the load, so that it is possible to maintain an equivalence ratio at 1 regardless of a change in the load. Further, by including the plurality of fuel supply passages and the plurality of oxidant supply passages, it is possible to suppress an excessive rise in supply pressures of the fuel and the oxidant, and maintain stable combustion.

Note that an arrangement constitution of the first fuel nozzle part 110 and the second fuel nozzle parts 120 is not limited to the above-mentioned arrangement constitution. For example, a plurality of first fuel nozzle parts 110 may be included.

Fourth Embodiment

Figure 13:
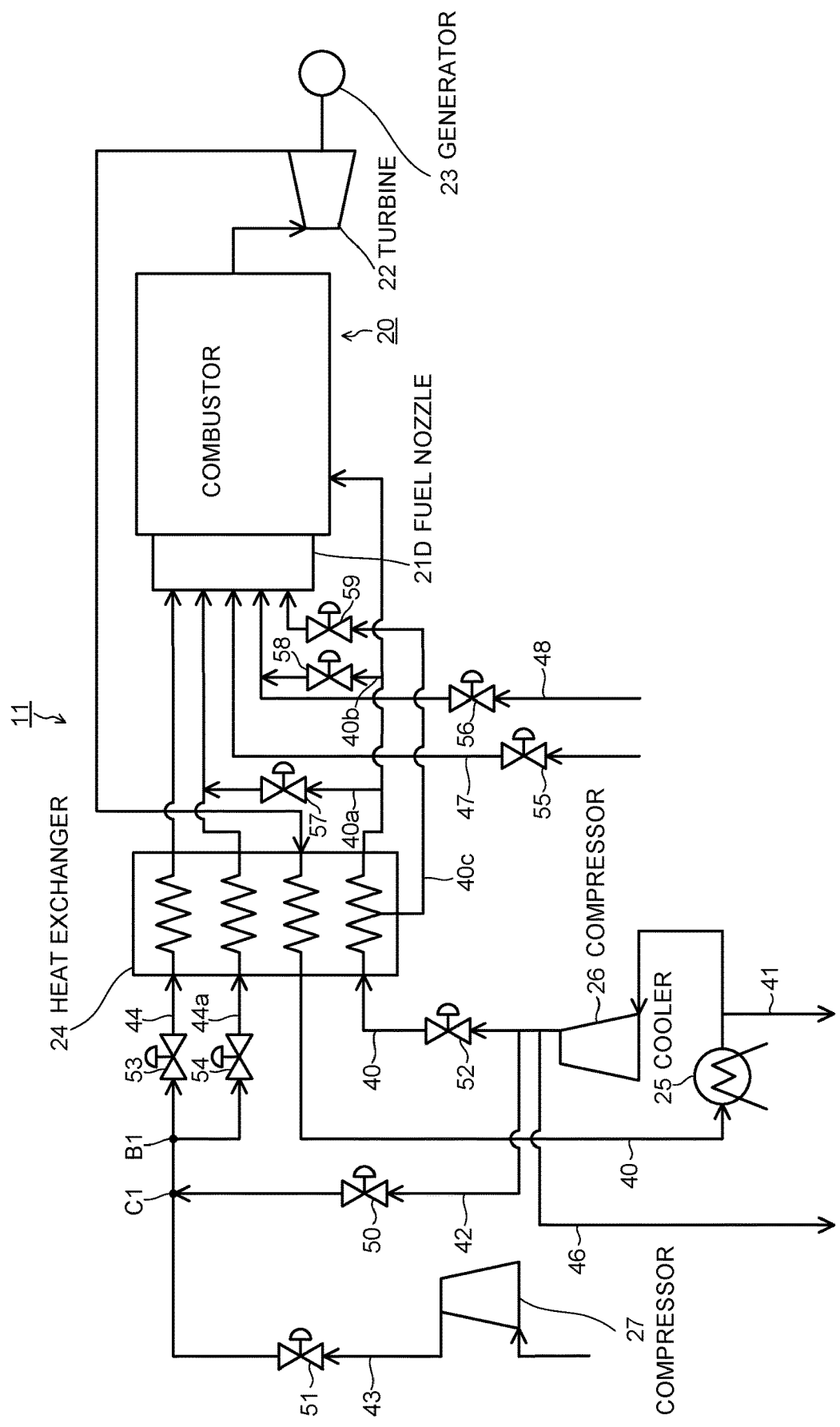
FIG. 13 is a system diagram of a gas turbine facility including a combustor of a fourth embodiment.

FIG. 13 is a system diagram of a gas turbine facility 11 including a combustor 20 of a fourth embodiment. The gas turbine facility 11 illustrated in FIG. 13 is different from the gas turbine facility 10 illustrated in FIG. 1 in that a pipe 40c branching off a pipe 40 is provided. Further, a fuel nozzle 21D of the combustor 20 of the fourth embodiment is different from the fuel nozzle 21A of the combustor 20 of the first embodiment in that a cooling gas passage is included. Here, the above different constitution will be mainly explained.

As illustrated in FIG. 13, as described above, in the downstream of a heat exchanger 24, the pipe 40 has pipes 40a and 40b each branching off the pipe 40. Moreover, the pipe 40 has a pipe 40c branching off the pipe 40 in the heat exchanger 24.

The pipe 40c is coupled to the fuel nozzle 21D. In the pipe 40c, a flow rate regulating valve 59 is interposed. Since the pipe 40c branches off the pipe 40 in the heat exchanger 24, a temperature of the carbon dioxide flowing through the pipe 40c is lower than temperatures of the carbon dioxide flowing through the pipes 40a and 40b. Note that a branch position of the pipe 40c is set based on a temperature of the carbon dioxide to be extracted.

Providing the pipe 40c in this manner makes it possible to guide the carbon dioxide extracted from the pipe 40c in the heat exchanger 24, to the fuel nozzle 21D. In this case, for example, the carbon dioxide functions as a cooling gas for the fuel nozzle 21D.

Note that a plurality of pipes branching off the pipe 40 in the heat exchanger 24 and coupled to the fuel nozzle 21D can also be provided according to a form of the fuel nozzle 21D. Also in this case, in each of the pipes, a flow rate regulating valve is interposed.

Next, a constitution of the fuel nozzle 21D will be explained with reference to FIG. 14.

Figure 14:
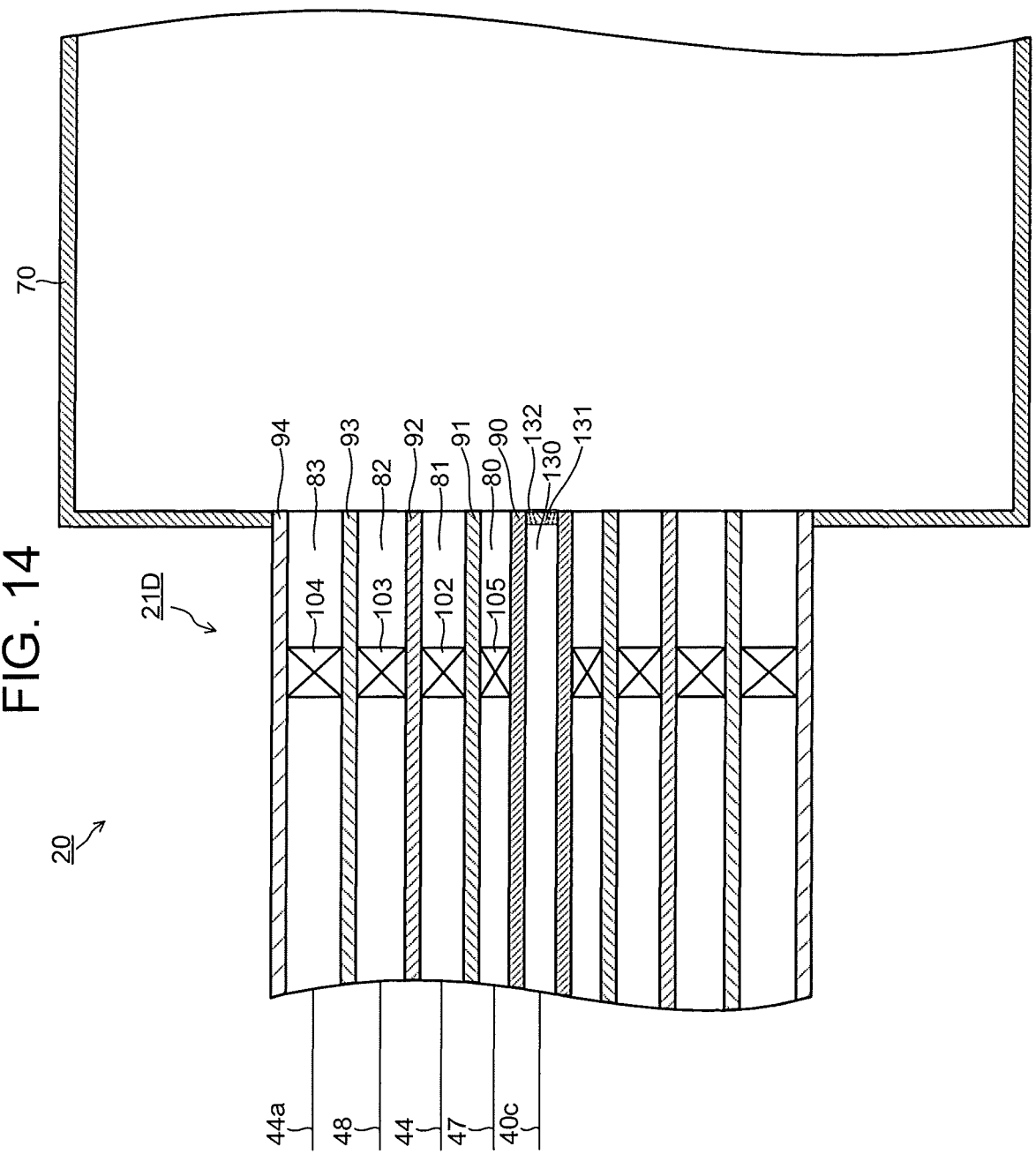
FIG. 14 is a view schematically illustrating a longitudinal section of a fuel nozzle of the combustor of the fourth embodiment.

FIG. 14 is a view schematically illustrating a longitudinal section of the fuel nozzle 21D of the combustor 20 of the fourth embodiment. Note that FIG. 14 schematically illustrates pipes for supplying the oxidant, the fuel, and the carbon dioxide to respective passages of the fuel nozzle 21D.

The fuel nozzle 21D includes a plurality of fuel supply passages which each supply the fuel and a plurality of oxidant supply passages which each supply the oxidant. Moreover, the fuel nozzle 21D includes the cooling gas passage through which the carbon dioxide being the cooling gas flows.

Concretely, the fuel nozzle 21D includes a cooling gas passage 130, a first fuel supply passage 80, a first oxidant supply passage 81, a second fuel supply passage 82, and a second oxidant supply passage 83. These passages are divided by cylindrical wall parts 90, 91, 92, 93, and 94.

As illustrated in FIG. 14, the cooling gas passage 130 is a column-shaped passage provided in the center. The cooling gas passage 130 is formed inside the wall part 90. The cooling gas passage 130 communicates with the pipe 40c. Then, the carbon dioxide being the cooling gas is supplied to the cooling gas passage 130 from the pipe 40c.

A tip of the cooling gas passage 130 (an end portion on a combustor liner 70 side) is closed by, for example, a flat plate 131. Then, in the flat plate 131, for example, a plurality of jet ports 132 are formed. The cooling gas is jetted from these jet ports 132 into the combustor liner 70.

The jet ports 132 may have, for example, a constitution similar to that of the jet ports 101 formed in the flat plate 100 in the first embodiment. That is, the jet ports 132 may have a constitution in which a swirling component is imparted to flows of the cooling gas which has passed through the jet ports 132. In this case, the swirling direction imparted by passing through the jet ports 132 is the same as a swirling direction imparted by passing through a swirling flow generator 102 or the like.

Further, the jet ports 132 may each be a port formed in an axial direction of the fuel nozzle 21D. In this case, the cooling gas is jetted from the jet ports 132 in an axial direction of the combustor liner 70.

The first fuel supply passage 80 is a ring-shaped passage formed between the wall part 90 and the wall part 91. Further, the first fuel supply passage 80 is formed in a ring shape in an outer periphery of the cooling gas passage 130. The first fuel supply passage 80 communicates with a pipe 47. Then, the fuel is supplied to the first fuel supply passage 80 from the pipe 47.

In the first fuel supply passage 80, a ring-shaped swirling flow generator 105 is provided so as to impart a swirling component to a flow of the fuel jetted from the first fuel supply passage 80 into the combustor liner 70. Note that a constitution of the swirling flow generator 105 is similar to a constitution of the above-described swirling flow generator 102 or the like.

The first oxidant supply passage 81 is a ring-shaped passage formed between the wall part 91 and the wall part 92. Further, the first oxidant supply passage 81 is formed in a ring shape in an outer periphery of the first fuel supply passage 80. The first oxidant supply passage 81 communicates with a pipe 44. Then, the oxidant is supplied to the first oxidant supply passage 81 from the pipe 44.

The second fuel supply passage 82 is a ring-shaped passage formed between the wall part 92 and the wall part 93. Further, the second fuel supply passage 82 is formed in a ring shape in an outer periphery of the first oxidant supply passage 81. The second fuel supply passage 82 communicates with a pipe 48. Then, the fuel is supplied to the second fuel supply passage 82 from the pipe 48.

The second oxidant supply passage 83 is a ring-shaped passage formed between the wall part 93 and the wall part 94. Further, the second oxidant supply passage 83 is formed in a ring shape in an outer periphery of the second fuel supply passage 82. The second oxidant supply passage 83 communicates with a pipe 44a. Then, the oxidant is supplied to the second oxidant supply passage 83 from the pipe 44a.

Here, swirling directions of swirling flows generated by passing through the respective swirling flow generators 102, 103, 104, and 105 are set in the same direction. By setting the swirling directions in the same direction in this manner, it is possible to promote mixing of the fuel and the oxidant in a combustion area in the combustor liner 70.

In the fuel nozzle 21D, for example, from ignition to a rated load in the combustor 20, the cooling gas from the cooling gas passage 130, the fuel from the first fuel supply passage 80, and the oxidant from the first oxidant supply passage 81 are jetted into the combustor liner 70. Further, from a middle load to the rated load in the combustor 20, the fuel from the second fuel supply passage 82 and the oxidant from the second oxidant supply passage 83 are jetted into the combustor liner 70.

Further, from the ignition to just before the middle load, similarly to the first embodiment, the carbon dioxide after passing through a heat exchanger 24 may be guided to the second fuel supply passage 82 and the second oxidant supply passage 83.

As described above, according to the combustor 20 of the fourth embodiment, by including the cooling gas passage 130 through which the cooling gas flows, it is possible to suppress a rise in temperature of the fuel nozzle 21D.

Further, in the combustor 20 of the fourth embodiment, similarly to the first embodiment, oxidant flow rates can be increased in accordance with an increase in fuel flow rates accompanying the load, so that it is possible to maintain an equivalence ratio at 1 regardless of a change in the load. Further, by including the plurality of fuel supply passages and the plurality of oxidant supply passages, it is possible to suppress an excessive rise in supply pressures of the fuel and the oxidant, and maintain stable combustion.

Fifth Embodiment

Figure 15:
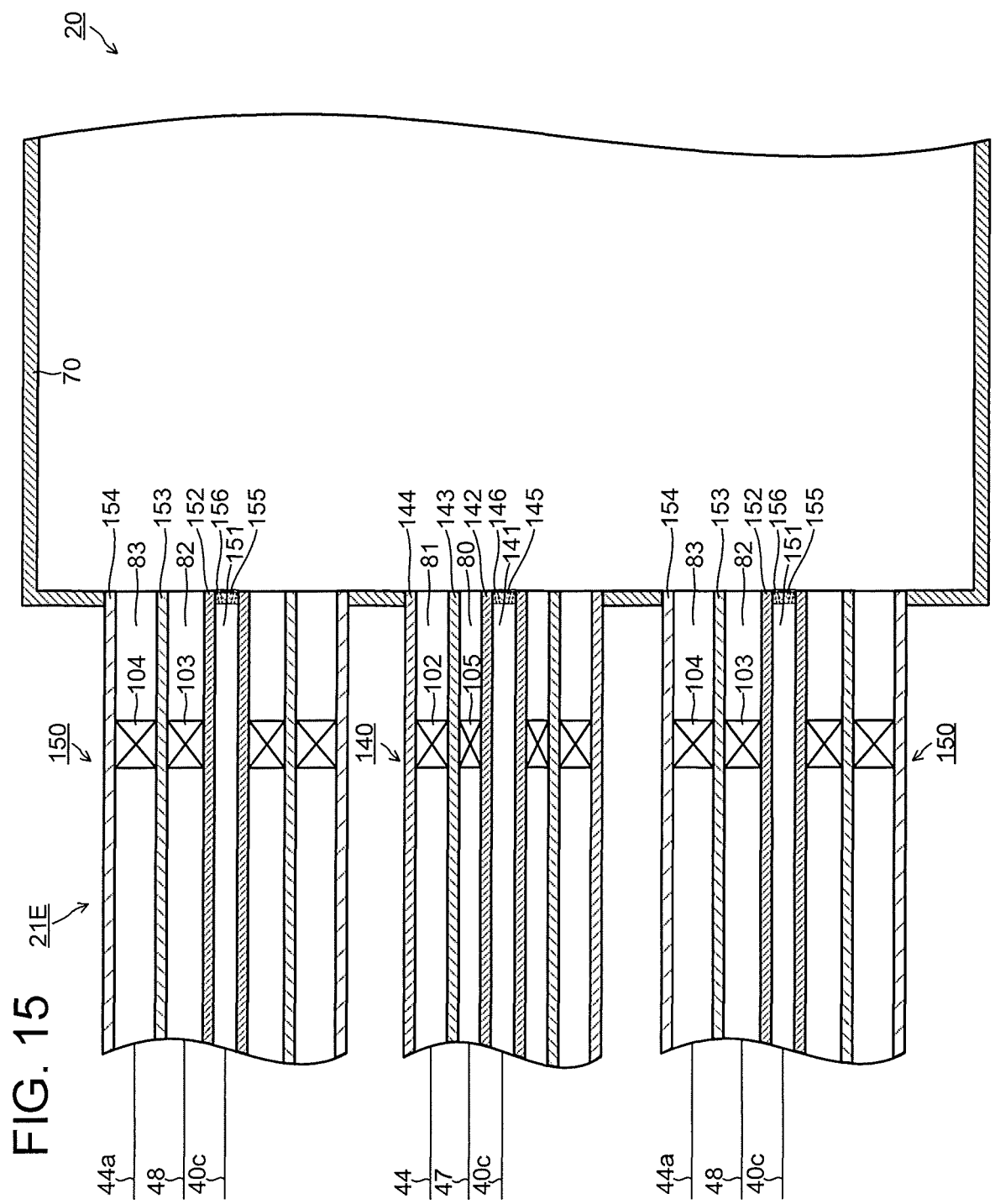
FIG. 15 is a view schematically illustrating a longitudinal section of a fuel nozzle of a combustor of a fifth embodiment.
Figure 16:
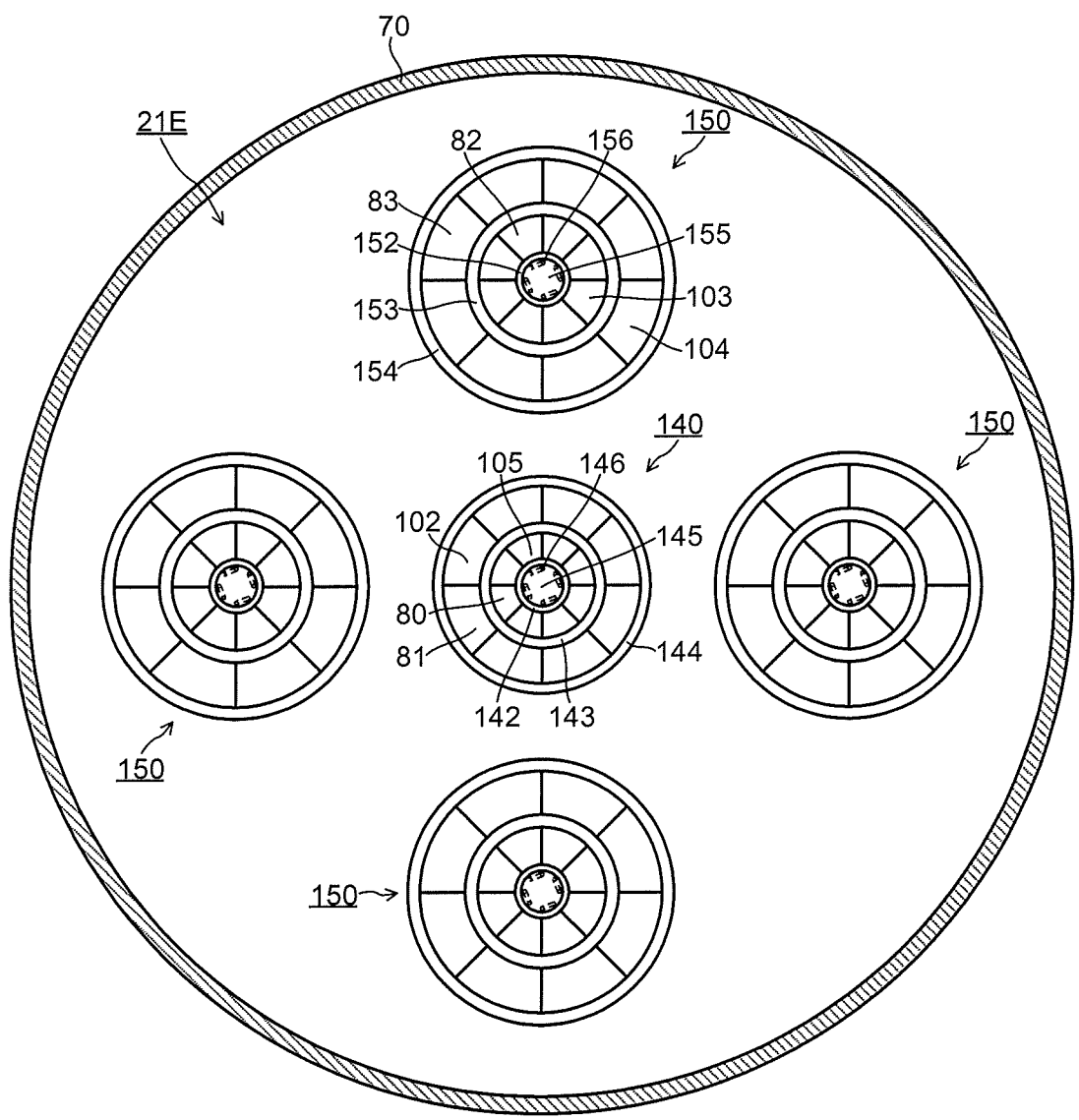
FIG. 16 is a plan view when the fuel nozzle of the combustor of the fifth embodiment is seen from a combustor liner side.
Figure 17:
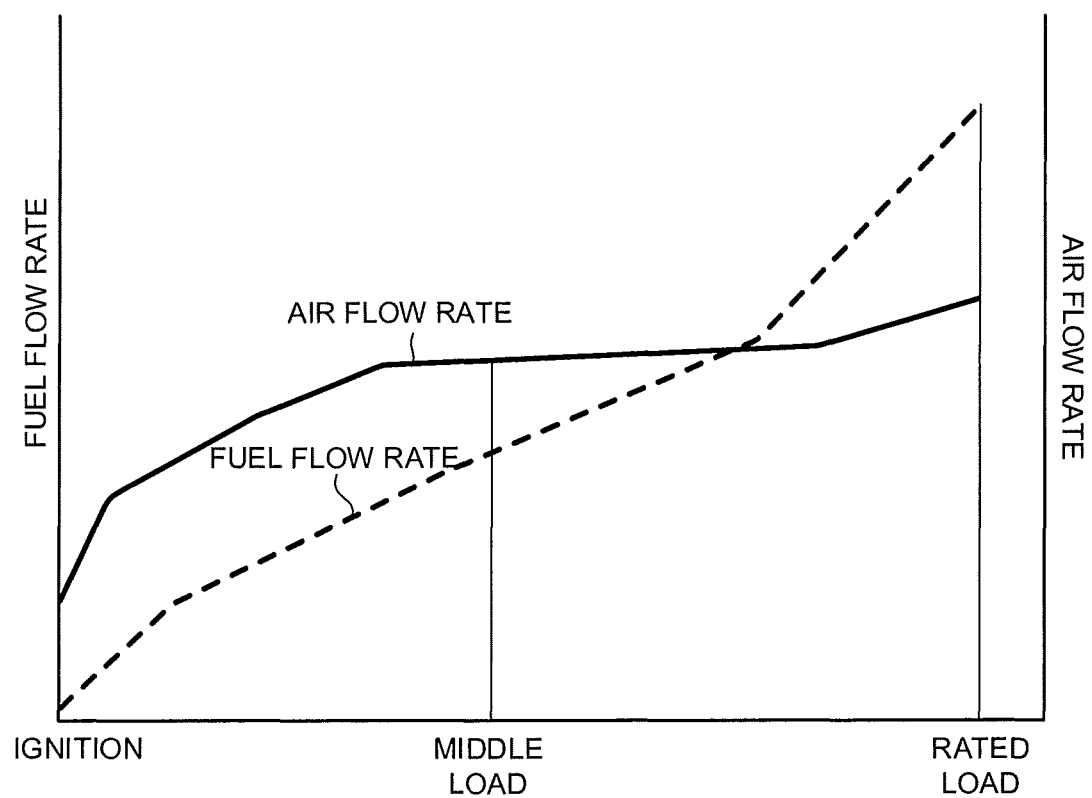
FIG. 17 is a chart illustrating changes in a fuel flow rate and an air flow rate supplied to a combustor from ignition to a rated load in a conventional gas turbine.
Figure 18:
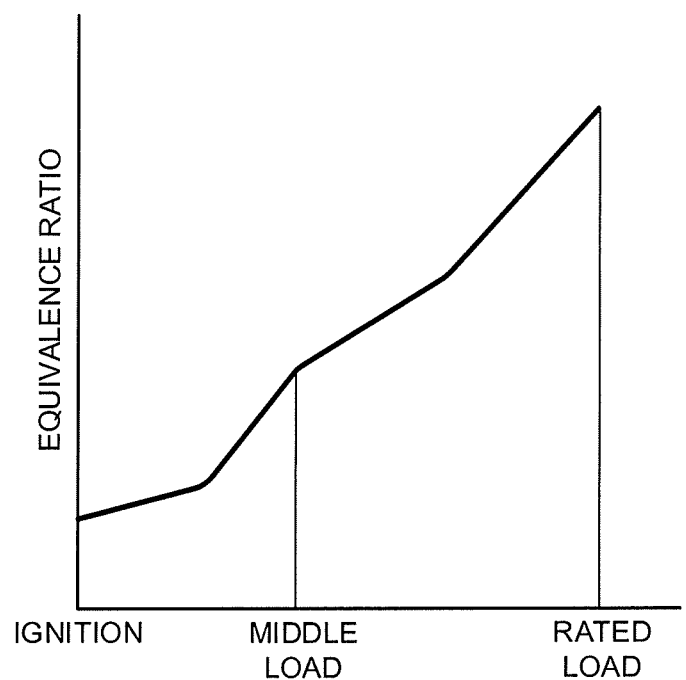
FIG. 18 is a chart illustrating a change in an equivalence ratio from the ignition to the rated load in the conventional gas turbine.

FIG. 15 is a view schematically illustrating a longitudinal section of a fuel nozzle 21E of a combustor 20 of a fifth embodiment. FIG. 16 is a plan view when the fuel nozzle 21E of the combustor 20 of the fifth embodiment is seen from a combustor liner 70 side. Note that FIG. 15 schematically illustrates pipes for supplying an oxidant and a fuel to respective passages of the fuel nozzle 21E.

Note that a system of a gas turbine facility in the fifth embodiment is the same as the system of the gas turbine facility in the fourth embodiment illustrated in FIG. 13.

As illustrated in FIG. 15 and FIG. 16, the fuel nozzle 21E includes a first fuel nozzle part 140 and second fuel nozzle parts 150. As illustrated in FIG. 16, for example, the first fuel nozzle part 140 is provided in the center, and a plurality of the second fuel nozzle parts 150 are provided around the first fuel nozzle part 140.

The first fuel nozzle part 140 includes a first cooling gas passage 141, a first fuel supply passage 80, and a first oxidant supply passage 81. These passages are divided by cylindrical wall parts 142, 143, and 144.

As illustrated in FIG. 15, the first cooling gas passage 141 is a column-shaped passage provided in the center. The first cooling gas passage 141 is formed inside the wall part 142. The first cooling gas passage 141 communicates with a pipe 40c. A tip of the first cooling gas passage 141 (an end portion on the combustor liner 70 side) is closed by a flat plate 145 in which a plurality of jet ports 146 are formed, similarly to the fourth embodiment.

The first fuel supply passage 80 is a ring-shaped passage formed between the wall part 142 and the wall part 143. The first fuel supply passage 80 is formed in a ring shape in an outer periphery of the first cooling gas passage 141. The first fuel supply passage 80 communicates with a pipe 47. Further, in the first fuel supply passage 80, a ring-shaped swirling flow generator 105 is provided.

The first oxidant supply passage 81 is a ring-shaped passage formed between the wall part 143 and the wall part 144. The first oxidant supply passage 81 is formed in a ring shape in an outer periphery of the first fuel supply passage 80. The first oxidant supply passage 81 communicates with a pipe 44. Further, in the first oxidant supply passage 81, a ring-shaped swirling flow generator 102 is provided.

The second fuel nozzle parts 150 each include a second cooling gas passage 151, a second fuel supply passage 82, and a second oxidant supply passage 83. These passages are divided by cylindrical wall parts 152, 153, and 154.

As illustrated in FIG. 15, each of the second cooling gas passages 151 is a column-shaped passage provided in the center. The second cooling gas passages 151 are each formed inside the wall part 152. The second cooling gas passages 151 each communicate with the pipe 40c. A tip of each of the second cooling gas passages 151 (an end portion on the combustor liner 70 side) is closed by a flat plate 155 in which a plurality of jet ports 156 are formed, similarly to the above-described first cooling gas passage 141.

Each of the second fuel supply passages 82 is a ring-shaped passage formed between the wall part 152 and the wall part 153. The second fuel supply passages 82 are each formed in a ring shape in an outer periphery of the second cooling gas passage 151. The second fuel supply passages 82 each communicate with a pipe 48. Further, in each of the second fuel supply passages 82, a ring-shaped swirling flow generator 103 is provided.

Each of the second oxidant supply passages 83 is a ring-shaped passage formed between the wall part 153 and the wall part 154. The second oxidant supply passages 83 are each formed in a ring shape in an outer periphery of the second fuel supply passage 82. The second oxidant supply passages 83 each communicate with a pipe 44a. Further, in each of the second oxidant supply passages 83, a ring-shaped swirling flow generator 104 is provided.

Swirling directions of swirling flows generated by passing through the respective swirling flow generators 102, 103, 104, and 105 are set, for example, in the same direction. By setting the swirling directions in the same direction in this manner, for example, when the fuel and the oxidant are jetted from the first fuel nozzle part 140 and the second fuel nozzle parts 150 to be combusted, it is possible to promote mixing of the fuel and the oxidant in a combustion area in the combustor liner 70.

Here, for example, from ignition to a rated load in the combustor 20, the fuel from the first fuel supply passage 80 and the oxidant from the first oxidant supply passage 81 are jetted into the combustor liner 70. Further, from a middle load to the rated load in the combustor 20, the fuel from the second fuel supply passages 82 and the oxidant from the second oxidant supply passages 83 are jetted into the combustor liner 70.

Accordingly, from the ignition to the rated load, flames are formed in the downstream of the first fuel nozzle part 140. Further, from the middle load to the rated load, flames are formed in the downstream of the first fuel nozzle part 140 and the second fuel nozzle parts 150.

Note that from the ignition to the rated load in the combustor 20, the cooling gas is supplied to the first cooling gas passage 141 and the second cooling gas passages 151.

Here, in the second fuel nozzle parts 150 provided in a plural number, for example, the number of fuel nozzle parts to be used may be increased with an increase in the load. Further, in the second fuel nozzle parts 150 provided in a plural number, for example, all the second fuel nozzle parts 150 may be used from the time of the middle load. In this case, the load in each of the second fuel nozzle parts 150 is increased with the increase in the load.

Further, from the ignition to just before the middle load, similarly to the first embodiment, the carbon dioxide after passing through a heat exchanger 24 may be guided to the second fuel supply passages 82 and the second oxidant supply passages 83, namely, the second fuel nozzle parts 150.

As described above, according to the combustor 20 of the fifth embodiment, by including the first cooling gas passage 141 and the second cooling gas passages 151, it is possible to suppress a rise in temperature of the first fuel nozzle part 140 and the second fuel nozzle parts 150.

Further, the combustor 20 of the fifth embodiment includes the plurality of fuel nozzle parts which each jet the fuel and the oxidant. Then, fuel flow rates and oxidant flow rates in the respective fuel nozzle parts can be each individually regulated. At a time of a high-load condition from the middle load to the rated load, increasing the load by using the plurality of second fuel nozzle parts 150 makes it possible to uniformize a temperature in a combustion area.

Further, in the combustor 20 of the fifth embodiment, similarly to the first embodiment, the oxidant flow rates can be increased in accordance with an increase in the fuel flow rates accompanying the load, so that it is possible to maintain an equivalence ratio at 1 regardless of a change in the load. Further, by including the plurality of fuel supply passages and the plurality of oxidant supply passages, it is possible to suppress an excessive rise in supply pressures of the fuel and the oxidant, and maintain stable combustion.

Note that an arrangement constitution of the first fuel nozzle part 140 and the second fuel nozzle parts 150 is not limited to the above-mentioned arrangement constitution. For example, a plurality of first fuel nozzle parts 140 may be included.

According to the above-explained embodiments, it becomes possible to optionally regulate the air flow rate in accordance with the fuel flow rate while suppressing an excessive rise in the supply pressure of the oxidant.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A gas turbine combustor, comprising:
   a cylindrical combustor liner; and
   a fuel nozzle which is provided at one end of the combustor liner and jets a fuel and an oxidant into the combustor liner, wherein
   the fuel nozzle comprises:
      a first fuel supply passage provided in the center;
      a second fuel supply passage formed in a ring shape in an outer periphery of the first fuel supply passage;
      a first oxidant supply passage formed in a ring shape in an outer periphery of the second fuel supply passage; and
      a second oxidant supply passage formed in a ring shape in an outer periphery of the first oxidant supply passage,
   flow rates of the fuel supplied to the respective fuel supply passages and flow rates of the oxidant supplied to the respective oxidant supply passages are each individually regulated,
   flows of the fuel and the oxidant jetted from the first fuel supply passage, the second fuel supply passage, and the second oxidant supply passage into the combustor liner each have a swirling component, and
   a flow of the oxidant jetted from the first oxidant supply passage into the combustor liner has a swirling component smaller than the swirling component of the flow of the fuel jetted from the second fuel supply passage into the combustor liner, or does not have the swirling component.

2. The gas turbine combustor according to claim 1, wherein an outlet end portion of the first oxidant supply passage is inclined to the second fuel supply passage.

3. The gas turbine combustor according to claim 1, wherein the oxidant is oxygen or a mixed gas composed of oxygen and carbon dioxide.

4. The gas turbine combustor according to claim 1, wherein,
   from ignition to a rated load in the gas turbine combustor, the fuel from the first fuel supply passage and the oxidant from the first oxidant supply passage are jetted into the combustor liner, and
   from a middle load to the rated load in the gas turbine combustor, the fuel from the second fuel supply passage and the oxidant from the second oxidant supply passage are jetted into the combustor liner.

5. The gas turbine combustor according to claim 4, wherein, from ignition to just before a middle load in the gas turbine combustor, carbon dioxide is supplied to the second fuel supply passage and the second oxidant supply passage.

* * * * *